United States Patent [19]
Kubota et al.

[11] Patent Number: 5,698,284
[45] Date of Patent: Dec. 16, 1997

[54] OPTICAL RECORDING MEDIUM

[75] Inventors: Takeshi Kubota; Hachiro Saito; Seiichi Nishikawa; Tetsuo Komori, all of Tokyo-to, Japan

[73] Assignee: Dai Nippon Printing Co., Ltd., Japan

[21] Appl. No.: 529,471

[22] Filed: Sep. 18, 1995

[30] Foreign Application Priority Data

| Sep. 21, 1994 | [JP] | Japan | 6-226330 |
| Jan. 30, 1995 | [JP] | Japan | 7-012192 |
| Mar. 2, 1995 | [JP] | Japan | 7-042638 |
| Jun. 7, 1995 | [JP] | Japan | 7-140206 |
| Jun. 28, 1995 | [JP] | Japan | 7-161830 |

[51] Int. Cl.$^6$ .................................. B32B 33/00
[52] U.S. Cl. .............. 428/64.7; 428/212; 428/412; 427/551; 369/275.5; 369/283; 369/286
[58] Field of Search ............... 369/275.5, 283, 369/286; 428/46, 212, 412, 64.7; 427/551

[56] References Cited

U.S. PATENT DOCUMENTS

| 5,111,033 | 5/1992 | Fujita et al. | 235/488 |
| 5,276,673 | 1/1994 | Kobayashi et al. | 369/275.3 |
| 5,422,226 | 6/1995 | Aihara et al. | 430/273 |

*Primary Examiner*—Stevan A. Resan
*Attorney, Agent, or Firm*—Parkhurst, Wendel & Burr, L.L.P.

[57] ABSTRACT

The present invention relates to an optical recording medium which has excellent scratch resistance and resistance to cracking derived from warpage and bending. It comprises a card substrate; and, laminated on the card substrate, an optical recording member comprising a laminate of a transparent protective layer and an optical recording material layer, wherein a specific surface hard layer is provided on the transparent protective layer.

37 Claims, 8 Drawing Sheets

OPTICAL RECORDING MEDIUM

TECHNICAL FIELD

The present invention relates to an optical recording medium and more particularly to an optical card which can be used in credit cards, debit cards, cards for medical data and the like.

BACKGROUND OF THE INVENTION

Regarding recording media in a card form, optical cards having a higher storage stability than magnetic cards and IC cards have hitherto been developed in the art. Recording systems in the optical cards include read only memory (ROM), written once read-many (DRAW), and erasable recording (E-DRAW) systems, and recording media and constructions for each recording system have been studied.

These optical cards basically have a layer construction as shown in FIG. 1. In FIG. 1, numeral 1 designates a transparent protective layer as a support. Materials for the transparent protective layer are not particularly limited so far as they exhibit high light transmission in a wavelength region of light from a light source used for recording and reproduction of information, cause neither deformation nor deterioration in steps after the formation of the optical card, and satisfy mechanical strength and optical properties requirements. Materials commonly used for the transparent protective layer include polycarbonate, acrylic, urethane, epoxy, polyvinyl chloride, polyolefin, and styrene/polycarbonate blend resins. Numeral 2 designates a pattern layer provided by photopolymer process (2P method) on the undersurface of the transparent protective layer 1. In this case, the interface between layers 1 and 2 disappears by use of injection or casting method. The patter layer is provided with grooves as tracks. Numeral 3 designates an optical recording material layer provided so as to cover the grooves of the pattern layer 2. For example, in the case of the DRAW type recording system, the optical recording material layer is generally formed of an inorganic material, for example, a low-melting metal, such as tellurium, bismuth, or aluminum or an alloy thereof, or an organic dye, such as anthraquinone, naphthoquinone, triphenylmethane, carbocyanine, merocyanine, xanthene, azo, azine, thiazine, oxazine, or phthalocyanine dye. On the other hand, in the case of the ROM type recording system, the optical recording material layer is formed of a high-reflective metal, such as aluminum, with information being previously recorded thereon. Numeral 4 designates a card substrate which supports an optical recording member having the above construction through an adhesive layer 5.

The above optical card has such a structure that the optical recording material layer 3 is sandwiched between the transparent protective layer 1 on the top side of the card and the card substrate 4 on the back side of the card. If necessary, a surface hard layer is provided on the top surface of the transparent protective layer 1 for the purpose of preventing the creation of flaws during carrying or during use of the card, thereby improving the durability of the card and the reliability of the writing and reading accuracy. The surface hard layer is, in many cases, formed using a radiation-curable resin.

In the above conventional optical cards, it is desired to use a polycarbonate resin for the transparent protective layer for the optical recording material layer. This is because the polycarbonate resin is advantageously inexpensive, does not absorb water, causes neither warping nor cracking, and has excellent bending strength.

Since, however, the polycarbonate resin has low scratch resistance (i.e., low pencil hardness), the use of the polycarbonate resin for the transparent protective layer necessitates providing a surface hard layer from the viewpoint of increasing the scratch resistance of the card. In this case, the formation of a surface hard layer using a conventional radiation-curable resin having a large shrinkage on the transparent protective layer results in a fear of shrinkage during radiation curing to cause warpage or cracking by bending. For this reason, the surface hard layer should not be formed in a thickness of not less than 15 µm. If the thickness of the surface hard layer is about 15 µm at the largest, the hardness of the surface hard layer is influenced by the underlying transparent protective layer in a pencil hardness test, so that the pencil hardness is as low as about F to HB. Therefore, in this case, a surface hard layer having a pencil hardness of H or higher, which offers satisfactory scratch resistance, cannot be provided.

Under the above circumstances, the present invention has been made, and an object of the present invention is to provide an optical recording medium which has excellent scratch resistance and causes neither warpage nor cracking by bending.

DISCLOSURE OF THE INVENTION

According to a first aspect of the present invention, there is provided an optical recording medium comprising: a card substrate; and, laminated on the card substrate, an optical recording member comprising a laminate of at least a transparent protective layer and an optical recording material layer, the transparent protective layer being formed of a polycarbonate resin and bearing an intermediate layer, having a thickness of not less than 20 µm, formed of a radiation-cured resin having a shrinkage of not more than 12% and a surface hard layer provided on the intermediate layer.

According to a second aspect of the present invention, there is provided an optical recording medium comprising at least a transparent protective layer and an optical recording layer laminated on top of the other, the transparent protective layer bearing a multilayered hard layer, layers constituting the hard layer having been formed by using radiation-curable resins in such a manner that the shrinkage on curing of the radiation-curable resins successively increases from the innermost layer toward the outermost layer, the thickness of the layers constituting the hard layer being successively reduced from the innermost layer toward the outermost layer.

According to a third aspect of the present invention, there is provided an optical recording medium comprising a laminate of at least a transparent protective layer and an optical recording layer, the transparent protective layer bearing a hard layer formed of a cured resin, the hardness of the hard layer increasing continuously from the interface of the hard layer and the transparent protective layer toward the outer surface of the hard layer.

According to a fourth aspect of the present invention, there is provided a process for producing an optical recording medium comprising a laminate of at least a transparent protective layer and an optical recording layer, the transparent protective layer bearing a hard layer formed of a cured resin, wherein a plurality of curable resins different from each other or one another in shrinkage on curing are simultaneously fed in such a manner that they are put on top of the other or one another so that the shrinkage on curing of the curable resins increases from the interface of the curable resin and the transparent protective layer toward the outer surface of the resultant laminate, thereby forming a laminate of a plurality of layers different from each other or one another in shrinkage on curing, and the plurality of layers constituting the laminate are collectively cured to form a hard layer.

According to a fifth aspect of the present invention, there is provided an optical recording medium comprising at least a transparent protective layer and an optical recording layer laminated on top of the other, the transparent protective layer bearing a multilayered hard layer, layers constituting the hard layer having been formed by using radiation-curable resins in such a manner that the shrinkage on curing of the radiation-curable resins successively increases from the innermost layer toward the outermost layer, all the layers, constituting the hard layer except for the innermost layer, containing at least of one kind of an organic polymer type leveling agent.

According to a sixth aspect of the present invention, there is provided an optical recording medium comprising at least a transparent protective layer and an optical recording layer laminated on top of the other, the transparent protective layer bearing a multilayered hard layer, layers constituting the hard layer having been formed by using radiation-curable resins in such a manner that the shrinkage on curing of the radiation-curable resins for forming the layers successively increases from the innermost layer toward the outermost layer, all the layers, constituting the hard layer except for the outermost layer, containing an organic polymer type leveling agent in combination with a silicone.

According to a seventh aspect of the present invention, there is provided an optical recording medium comprising: a card substrate; and, laminated on the card substrate, an optical recording member comprising a laminate of at least a transparent protective layer and an optical recording layer, a magnetic stripe being provided on the transparent protective layer side.

BEST MODE FOR CARRYING OUT THE INVENTION

Embodiments of the present invention will now be described in detail with reference to the accompanying drawings.

First Invention

Figure 1:
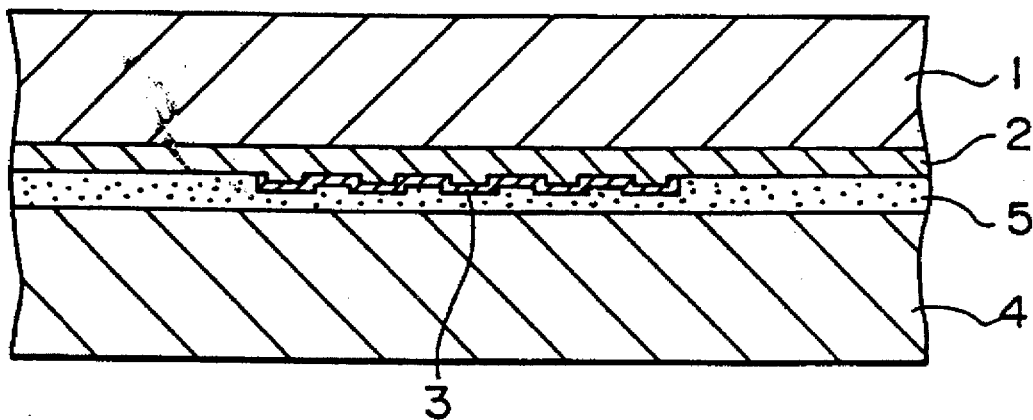
FIG. 1 is a cross-sectional view showing a construction of a conventional optical card.
Figure 2:
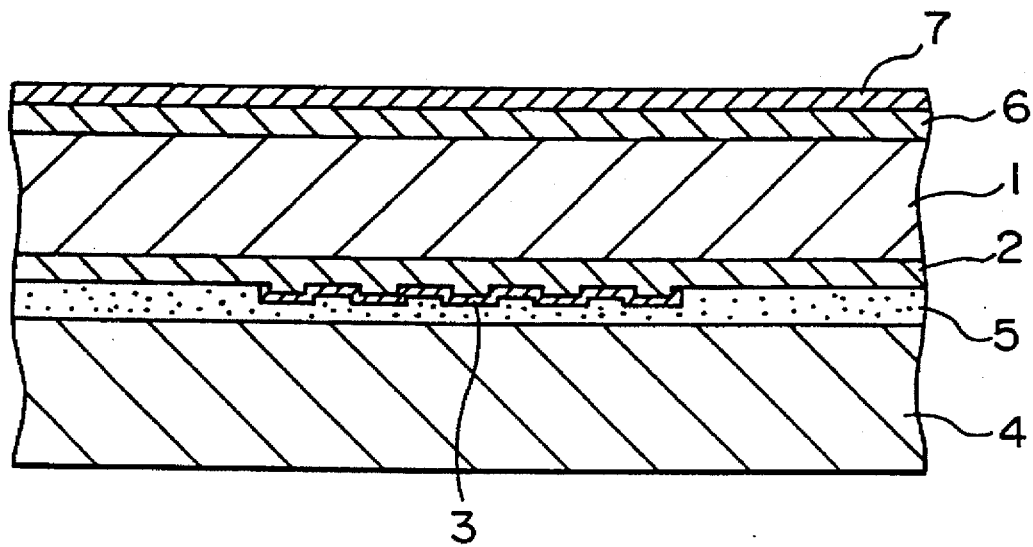
FIGS. 2 to 4 and FIG. 7 are cross-sectional views of optical cards according to embodiments of the present invention.

FIG. 2 is a cross-sectional view of an optical recording medium (optical card) according to an embodiment of the first invention. As shown in FIG. 2, the optical card according to this embodiment has the following construction. A pattern layer 2 and an optical recording material layer 3 covering grooves of the pattern layer 2 are provided on the undersurface of the transparent protective layer 1. A card substrate 4 is laminated through an adhesive layer 5 so as to sandwich the optical recording material layer 3 between the card substrate and the pattern layer 2. An intermediate layer 6 and a surface hard layer 7 are laminated on the transparent protective layer 1.

The polycarbonate resin (PC) used for constituting the transparent protective layer 1 preferably has good optical properties. Specifically, the use of a polycarbonate resin having a light beam transmittance of not less than 90% (780 nm, 830 nm), a refractive index of not more than 1.59 (780 nm, 830 nm), a optical retardation of not more than 100 nm (single pass), or an optical elastic axis of not more than ±5% is preferred. The total thickness of the transparent protective layer and the hard surface layer is preferably about 380±20 µm. More specifically, when 2P is used for the formation of the pattern layer 2, an extruded film, for example, Panlite Film manufactured by Teijin Ltd. or Lexan Film manufactured by GE, may be used.

The intermediate layer 6 is formed to a thickness of not less than 20 µm using a radiation-curable resin, having a shrinkage of not more than 12%, containing a functional monomer and/or a functional oligomer. For example, when a 20 µm-thick layer is formed using a radiation-curable resin having a shrinkage of 12.3% on a 0.4 mm-thick PC sheet having a size of 200 mm×200 mm and put on a desk, the warpage of the PC sheet becomes 4.5 mm. When a sheet process is used, a warpage of not less than 4 mm leads to problems in subsequent steps. Further, when a card is prepared from the laminate, the warpage of the PC sheet is taken over by the card and the warpage of the card becomes 2.2 mm. Such a card is below standard and further has deteriorated optical properties. On the other hand, when a 20 µm-thick layer is formed using a radiation-curable resin having a shrinkage of 11.9% in the same manner as described above and put on a desk, the warpage of the PC sheet becomes 4.0 mm. When a card is prepared from the laminate, the warpage of the card becomes 1.8 mm. This card satisfies standard requirements. For this reason, a radiation-curable resin having a shrinkage of not more than 12% is used in the present invention.

Examples of the functional monomer include polyfunctional acrylates including monofunctional acrylates, such as (2-ethylhexyl acrylate, 2-hydroxyethyl acrylate, 2-hydroxypropyl acrylate and the like), difunctional acrylates (1,3-butanediol diacrylate, 1,4-butanediol diacrylate, 1,6-hexanediol diacrylate, diethylene glycol diacrylate, neopentyl glycol diacrylate and the like), trifunctional acrylates (pentaerythritol triacrylate, trimethylolpropane triacrylate and the like), tetrafunctional acrylates (pentaerythritol tetraacrylate and the like), pentafunctional acrylates (dipentaerythritol pentaacrylate and the like), hexafunctional acrylates (dipentaerythritol hexaacrylate and the like), and penta- or higher functional acrylates (dipentaerythritol penta- and hexaacrylates and the like).

Examples of the functional oligomer include epoxy acrylate, urethane acrylate, polyester acrylate, polyether acrylate, silicone acrylate, unsaturated polyester, and polyene/thiol.

The functional monomer and/or functional oligomer are used in combination with N-vinylpyrrolidone as an agent for improving the adhesion to the polycarbonate and a reaction retardant, Irgacure 651, 184 or the like as an initiator (a benzoin, acetophenone, thioxanthone, peroxide or other initiator) and the like to prepare a radiation-curable resin having a shrinkage of not more than 12%. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In general, the use of a polyfunctional acrylate is likely to increase the hardness. In this case, however, the shrinkage becomes large. The shrinkage should be not more than 12% in order to provide a low warpage and ensure satisfactory hardness because a surface hard layer having a thickness of not less than 20 µm is provided for avoiding the influence of the substrate. A shrinkage of 10% and a thickness of 25 to 30 µm are suitable in order to satisfy warpage and hardness requirements.

Regarding the surface hard layer 7, in order to ensure the hardness, N-vinylpyrrolidone as an agent for improving the adhesion to the polycarbonate and a reaction retardant and an initiator are added to a tri- to hexafunctional monomer as a functional monomer. Further, an internal curing type silicone, a silicone or the like is added as a leveling agent in an amount of 0.01 to 10 parts by weight based on 100 parts by weight of the functional monomer or functional oligomer. The addition of the leveling agent in an amount exceeding 10 parts by weight is unfavorable because the adhesion to the intermediate 6 is likely to be lowered. The leveling agent serves to reduce surface defects and, at the same time, increase the apparent hardness because the slip property is improved. Further, a small amount of a functional oligomer may be added in order to ensure a certain degree of bending strength. In some cases, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. A thickness of more than 15 µm is unfavorable because the warpage of the optical card is likely to increase and the bending strength is lowered. More specifically, cracking occurs in a bending test. On the other hand, when the thickness is less than 2 µm, the hardness becomes unsatisfactory. For this reason, the thickness of the surface hard layer is preferably in the range of from 2 to 15 µm, still preferably 2 to 8 µm. If necessary, the resin used for constituting the intermediate layer may be added in an amount of not more than 30% in order to further increase the bending strength.

An antistatic agent may be added to the intermediate layer 6 and/or the surface hard layer 7 for antistatic purposes. The intermediate layer 6 and the surface hard layer 7 may be formed by gravure coating, roll coating, Komma coating, spin coating, knife coating, silk screen coating, T-die coating, slide coating, slit reverse coating or the like. In this case, coating may be carried out after dilution with a solvent to a suitable extent. It should be noted that the intermediate layer 6 may be formed by multicoat coating to have a multilayer structure.

The pattern layer 2 provided on the undersurface of the transparent protective layer 1 may be generally formed by 2P, injection, casting, or other known methods. When the pattern layer 2 is formed by the 2P method, the resin used is a UV-curable resin. On the other hand, when the pattern layer 2 is formed by the injection or casting method, the resin used may be the same as that used in the transparent protective layer.

The optical recording material layer 3 may be formed of a commonly used metallic optical recording material, such as a tellurium- or bismuth-based material. It may also be formed of a dye optical recording material, such as phthalocyanine- or naphthoquinone-based recording material. The optical recording material layer may be of ROM type as well as write-once read-many type.

The card substrate 4 is formed of polyvinyl chloride, polyethylene terephthalate, acrylic styrene (AS), ABS, polycarbonate, polypropylene or the like. In the case of the card substrate formed of polyvinyl chloride, the layer construction may be of any of a three-layer type of 0.05/0.20/0.05 mm, 0.05/0.24/0.05 mm, 0.05/0.26/0.05 mm, 0.05/0.30/0.05 mm or the like, a two-layer type of 0.20/0.10 mm, 0.24/0.10 mm, 0.26/0.10 mm, 0.30/0.10 mm or the like, a single layer type of 0.30 mm, 0.34 mm, 0.36 mm, or 0.40 mm, and the like. 0.10 mm-thick polyvinyl chloride and 0.05 mm-thick polyvinyl chloride are transparent. On the other hand, polyvinyl chloride having a thickness of not less than 0.20 mm is pearlescent. In order to enhance the abrasion resistance of a print, it is preferred for the card substrate to have a two- or three-layer structure prepared by conducting printing on a pearlescent polyvinyl chloride and heat-sealing a transparent polyvinyl chloride to the printed pearlescent polyvinyl chloride.

Known adhesives, such as urethane, epoxy, acrylic, vinyl, and amide adhesives, may be used as an adhesive for the adhesive layer 5. Since, however, the adhesive comes into direct contact with the optical recording material layer, it preferably has high recording sensitivity and excellent temperature and moisture resistance. The thickness of the adhesive layer is preferably about 10 to 100 µm, and gravure coating, spin coating, knife coating, silk screen coating, Mayer bar coating, T-die coating or the like may be used to form the adhesive layer. The bonding is carried out by hot pressing using a flat press, a roll press or the like.

When the recording sensitivity of the optical recording material layer is unsatisfactory, a sensitizing layer may be provided between the optical recording material layer and the adhesive layer. The provision of the sensitizing layer is unnecessary when the recording sensitivity is satisfactory. The adhesive layer is in contact with the optical recording material layer. If the adhesive deteriorates the sensitivity of the optical recording material layer, a transparent protective layer may be provided for avoiding this unfavorable phenomenon. When the sensitizing layer is provided, the transparent protective layer is provided between the sensitizing layer and the adhesive layer. However, the transparent protective layer may serve also as the sensitizing layer. When the adhesive layer is formed of a material which does not deteriorate the optical recording material layer, there is no need to provide the transparent protective layer.

Further, in order to diversify the use of the card, a magnetic stripe may be provided on one side of the card substrate, which is the same as or opposite to the side where the optical recording material is provided, or both sides of the card substrate, and an IC module may be provided on one side of the card substrate which is the same as or opposite to the side where the optical recording material is provided.

Second Invention

The optical recording medium according to the second aspect of the present invention comprises at least a transparent protective layer and an optical recording layer laminated on top of the other, the transparent protective layer bearing a multilayered hard layer, layers constituting the hard layer having been formed by using radiation-curable resins in such a manner that the shrinkage on curing of the radiation-curable resins successively increases from the innermost layer toward the outermost layer, the thickness of the layers constituting the hard layer being successively reduced from the innermost layer toward the outermost layer.

In this case, it is preferred to add a leveling agent to the outermost layer in the hard layer or to add an internal curing type leveling agent to all the layers constituting the hard layer except for the outermost layer. Further, the addition of an antistatic agent to each of the layers constituting the hard layer is preferred.

The use of a radiation-curable resin having a low shrinkage on curing enables the warpage of the transparent protective layer to be suppressed on a small level even though the radiation-curable resin is coated in a large thickness on the transparent protective layer. Therefore, in this case, coating may be carried out in a thickness large enough to avoid the influence of the underlying transparent protective layer in a pencil hardness test. The coating in such a thickness can provide a pencil hardness of H to 2H. The radiation-curable resin having a low shrinkage on curing is flexible. Since, however, it as such is soft, the hard layer formed using such a resin has low resistance to abrasion, such as Taber abrasion (a Taber abrasion test specified in ASTM D1044) and a falling sand abrasion test (specified in JIS T8147) although the pencil hardness can be improved by increasing the coating thickness of the radiation-curable resin. On the other hand, a radiation-curable resin having a large shrinkage on curing has excellent resistance to abrasion, such as Taber abrasion, although the warpage on shrinkage is large. Therefore, the provision of a multilayered hard layer comprising layers formed by using radiation-curable resins in such a manner that the shrinkage on curing of the radiation-curable resins successively increases from the innermost layer toward the outermost layer, the thickness of the layers being successively reduced from the innermost layer toward the outermost layer, can offer an optical recording medium which has a lowered warpage and, by virtue of synergistic effect of the layers constituting the hard layer, has excellent pencil hardness and resistance to abrasion such as Taber abrasion.

Figure 3:
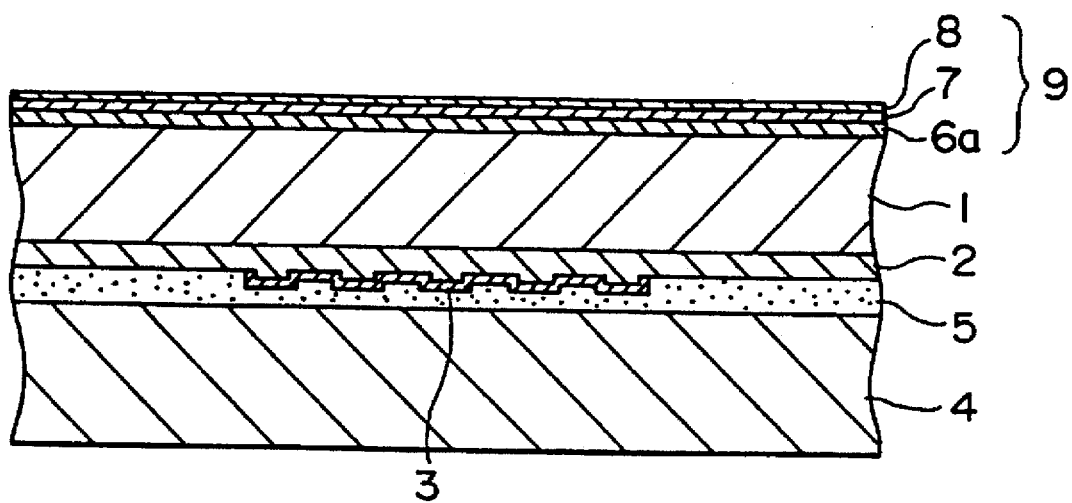

FIG. 3 is a cross-sectional view of an embodiment of an optical card which is one form of the optical recording medium of the present invention.

As shown in FIG. 3, the optical card has the following construction. A pattern layer 2 and an optical recording layer 3 covering grooves of the pattern layer 2 are provided on the undersurface of a transparent protective layer 1. A card substrate 4 is laminated through an adhesive layer 5 so as to sandwich the optical recording layer 3 between the card substrate 4 and the pattern layer 2. A hard layer 9, having a three-layer structure, of a first layer 6a, a second layer 7, and a third layer 8 is laminated on the transparent protective layer 1.

The resin used for constituting the transparent protective layer 1 preferably has good optical properties. Specifically, the use of a resin having a light beam transmittance of not less than 90% (780 nm, 830 nm), an optical retardation of not more than 100 nm (single pass), or an optical elastic axis of not more than ±5% is preferred. The total thickness of the transparent protective layer and the hard layer 9 is preferably about 380±20 μm. Among conventional resins commonly used in the art, a polycarbonate resin (PC) is particularly preferred, and it is also possible to use an acrylic resin having the above optical properties. For example, when 2P method is used for the formation of the pattern layer 2 on one side of the transparent protective layer, an extruded polycarbonate resin film, for example, Panlite Film manufactured by Teijin Ltd. or Lexan Film manufactured by GE, may be used. In this case, the interface between the layers 1 and 2 disappears by use of injection or casting method. The first layer 6a in the hard layer 9 is formed in a thickness of not less than 20 μm using a radiation-curable resin, having a low shrinkage on curing, containing a functional monomer and/or a functional oligomer on the transparent protective layer 1. For example, when a 20 μm-thick layer is formed using a radiation-curable resin having a shrinkage on curing of 12.3% on a 0.4 mm-thick PC sheet having a size of 200 mm×200 mm and put on a desk, the warpage of the PC sheet becomes 4.5 mm. When a sheet process is used, a warpage of not less than 4 mm leads to a trouble in subsequent steps. Further, when a card is prepared from the laminate, the warpage of the PC sheet is taken over by the card and the warpage of the card becomes 2.2 mm. Such a card does not meet standard requirements and further has deteriorated optical properties. On the other hand, when a 20 μm-thick layer is formed using a radiation-curable resin having a shrinkage on curing of 11.9% in the same manner as described above and put on a desk, the warpage of the PC sheet becomes 4.0 mm. When a card is prepared from the laminate, the warpage of the card becomes 1.8 mm. This card satisfies standard requirements. For this reason, a radiation-curable resin having a shrinkage on curing of not more than 12% is used in the present embodiment.

Examples of the functional monomer include polyfunctional acrylates including monofunctional acrylates, such as (2-ethylhexyl acrylate, 2-hydroxyethyl acrylate, 2-hydroxypropyl acrylate and the like), difunctional acrylates (1,3-butanediol diacrylate, 1,4-butanediol diacrylate, 1,6-hexanediol diacrylate, diethylene glycol diacrylate, neopentyl glycol diacrylate and the like), trifunctional acrylates (pentaerythritol triacrylate, trimethylolpropane triacrylate and the like), tetrafunctional acrylates (pentaerythritol tetraacrylate and the like), pentafunctional acrylates (dipentaerythritol pentaacrylate and the like), hexafunctional acrylates (dipentaerythritol hexaacrylate and the like), and penta- or higher functional acrylates (dipentaerythritol penta- and hexaacrylates and the like).

Examples of the functional oligomer include epoxy acrylate, urethane acrylate, polyester acrylate, polyether acrylate, silicone acrylate, unsaturated polyester, and polyene/thiol.

When the transparent protective layer 1 is formed of a polycarbonate resin, the functional monomer and/or functional oligomer are used in combination with N-vinylpyrrolidone as an agent for improving the adhesion to the polycarbonate and a reaction retardant, Irgacure 651, 184 or the like as an initiator (a benzoin, acetophenone, thioxanthone, peroxide or other initiator) and the like to prepare a radiation-curable resin having a shrinkage on curing of not more than 12%. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In general, the use of a polyfunctional acrylate is likely to increase the hardness, resulting in increased shrinkage on curing. The shrinkage on curing should be not more than 12% in order to form the first layer 6a in a thickness of not less than 20 μm, i.e., a thickness large enough to avoid the influence of the underlying layer, and, at the same time, to provide a low warpage and to ensure satisfactory hardness. A thickness of about 25 to 30 μm is most preferred.

The second layer 7 is formed using a radiation-curable resin of which the hardness and the shrinkage on curing are between those of the above first layer 6a and those of the third layer 8 described below. More specifically, a functional monomer and a functional oligomer may be selected so as for the shrinkage on curing of the radiation-curable resin to be about 12 to 15%. A thickness of 10 to 20 µm is most preferred for the second layer 7.

The third layer 8 is formed, on the second layer 7, using a radiation-curable resin, having a relatively high shrinkage on curing, comprising a tri- to hexafunctional monomer as a main agent and a minor amount of a functional oligomer added to the main agent, because it should have hardness high enough to be used as a surface layer. Further, the addition of a leveling agent, such as a silicone, in an amount of 0.01 to 10 parts by weight based on 100 parts by weight of the solid matter is preferred. The leveling agent serves to reduce surface defects and, at the same time, to increase the apparent hardness because the slip property is improved. The addition of the leveling agent in an amount exceeding 10 parts by weight, however, results in deteriorated adhesion to the second layer 7, while the addition of the leveling agent in an amount of less than 0.01 part by weight offers no effect. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In order to improve the bending strength, the proportion of the functional oligomer may be increased. In some cases, the resin used for constituting the second layer 7 may be incorporated in an amount of 0 to about 30%. Further, the shrinkage on curing of the radiation-curable resin used is regulated to not less than 15%. When the thickness of the third layer 8 is larger than 15 µm, the warpage of the optical card becomes large. Further, in this case, cracking occurs in a bending test, that is, the bending strength is unsatisfactory. On the other hand, when the thickness is smaller than 2 µm, the hardness is unsatisfactory. For this reason, the thickness is preferably 2 to 15 µm. However, a thickness of 2 to 5 µm is most preferred from the viewpoint of satisfying both the bending strength and hardness requirements.

An antistatic agent may be added to the first layer 6a, the second layer 7, and the third layer 8 constituting the hard layer 9 for antistatic purposes. The first layer 6a, the second layer 7, and the third layer 8 may be formed by gravure coating, roll coating, Komma coating, spin coating, knife coating, silk screen coating, T-die coating, slide coating, slit reverse coating or the like. In this case, coating may be carried out after dilution with a solvent to a suitable extent. It should be noted that the first layer 6a and the second layer 7 may be formed by multicoat coating to have a multilayer structure.

In order to improve the appearance, a leveling agent is preferably added to the first layer 6a and the second layer 7. Since, however, bleeding of the leveling agent on the surface deteriorates the adhesion, the use of an internal curing type leveling agent is preferred.

Although a hard layer 9 having a three-layer structure has been described in the present embodiment, the hard layer may have a two-, four-, or five-layer structure. In this case as well, the formation of layers for constituting the hard layer using radiation-curable resins in such a manner that the shrinkage on curing of the radiation-curable resins increases from the innermost layer toward the outermost layer enables the hardness of the cured surface to be increased while preventing the warpage of the card. Further, good bending strength can be ensured when the thickness of the layers constituting the hard layer is reduced from the innermost layer toward the outermost layer. Since the warpage of the card varies depending upon the shrinkage on curing and the thickness of the layers, the final layer construction may be determined using the shrinkage on curing and the thickness of the layers as parameters so as to minimize the warpage.

The pattern layer 2 provided on the undersurface of the transparent protective layer 1 may be generally formed by 2P, injection, casting, or other known methods. When the pattern layer 2 is formed by the 2P method, the resin used is a UV-curable resin. On the other hand, when the pattern layer 2 is formed by the injection or casting method, the resin used may be the same as that used in the transparent protective layer 1.

The optical recording layer 3 may be formed of a commonly used metallic optical recording material, such as a tellurium- or bismuth-based material. It may also be formed of a dye optical recording material, such as phthalocyanine- or naphthoquinone-based recording material. The optical recording layer 3 may be of ROM type as well as write-once read-many type.

The card substrate 4 is formed of polyvinyl chloride, polyethylene terephthalate, acrylic styrene (AS), ABS, polycarbonate, polypropylene or the like. In the case of the card substrate formed of polyvinyl chloride, the layer construction may be of any of a three-layer type of 0.05/0.20/0.05 mm, 0.05/0.24/0.05 mm, 0.05/0.26/0.05 mm, 0.05/0.30/0.05 mm or the like, a two-layer type of 0.20/0.10 mm, 0.24/0.10 mm, 0.26/0.10 mm, 0.30/0.10 mm or the like, a single layer type of 0.30 mm, 0.34 mm, 0.36 mm, or 0.40 mm, and the like. 0.10 mm-thick polyvinyl chloride and 0.05 mm-thick polyvinyl chloride are transparent. On the other hand, polyvinyl chloride having a thickness of not less than 0.20 mm is pearlescent. In order to enhance the abrasion resistance of a print, it is preferred for the card substrate to have a two- or three-layer structure prepared by conducting printing on a pearlescent polyvinyl chloride and heat-sealing a transparent polyvinyl chloride to the printed pearlescent polyvinyl chloride.

Known adhesives, such as urethane, epoxy, acrylic, vinyl, and amide adhesives, may be used as an adhesive for the adhesive layer 5. Since, however, the adhesive comes into direct contact with the optical recording layer 3, it preferably has high recording sensitivity and excellent temperature and moisture resistance. The thickness of the adhesive layer is preferably about 10 to 100 µm, and gravure coating, spin coating, knife coating, silk screen coating, Mayer bar coating, T-die coating or the like may be used to form the adhesive layer. The bonding is carried out by hot pressing using a flat press, a roll press or the like.

When the recording sensitivity of the optical recording layer 3 is unsatisfactory, a sensitizing layer may be provided between the optical recording layer 3 and the adhesive layer 5. The provision of the sensitizing layer is unnecessary when the recording sensitivity is satisfactory. The adhesive layer 5 is in contact with the optical recording layer 3. If the adhesive deteriorates the sensitivity of the optical recording layer 3, a transparent protective layer may be provided for avoiding this unfavorable phenomenon. When the sensitizing layer is provided, the transparent protective layer is provided between the sensitizing layer and the adhesive layer 5. However, the transparent protective layer may serve also as the sensitizing layer. When the adhesive layer is formed of a material which does not deteriorate the optical recording layer 3, there is no need to provide the transparent protective layer.

Further, in order to diversify the use of the card, a magnetic stripe may be provided on one side of the card substrate 4, which is the same as or opposite to the side where the optical recording medium is provided, or both sides of the card substrate 4, and an IC module may be provided on one side of the card substrate 4 which is the same as or opposite to the side where the optical recording medium is provided.

Third and Fourth Inventions

The optical recording medium according to the third invention comprises a laminate of at least a transparent protective layer and an optical recording layer, the transparent protective layer bearing a hard layer formed of a cured resin, the hardness of the hard layer increasing continuously from the interface of the hard layer and the transparent protective layer toward the outer surface of the hard layer. The cured layer may contain a leveling agent and an antistatic agent.

An optical recording medium having the above construction may be produced by the following process. Specifically, the fourth invention provides a process for producing an optical recording medium comprising a laminate of at least a transparent protective layer and an optical recording layer, the transparent protective layer bearing a hard layer formed of a cured resin, wherein a plurality of curable resins different from each other or one another in shrinkage on curing are simultaneously fed in such a manner that they are put on top of the other or one another so that the shrinkage on curing of the curable resins increases from the interface of the curable resin and the transparent protective layer toward the outer surface of the resultant laminate, and the plurality of layers constituting the laminate are collectively cured to form a hard layer.

In the formation of a plurality of hard layers by lamination, the formation of the layers by wet-to-wet coating followed by simultaneous curing enables a plurality of hard layer to be formed in a laminate form without creating any clear interface between the layers. The surface hard layer thus obtained has excellent properties.

The use of a radiation-curable resin having a low shrinkage on curing enables the warpage of the transparent protective layer to be suppressed on a small level even though the radiation-curable resin is coated in a large thickness on the transparent protective layer. Therefore, in this case, coating may be carried out in a thickness large enough to avoid the influence of the underlying transparent protective layer in a pencil hardness test. The coating in such a thickness can provide a pencil hardness of H to 2H. The radiation-curable resin having a low shrinkage on curing is flexible. Since, however, it as such is soft, the hard layer formed using such a resin has low resistance to abrasion such as Taber abrasion (a Taber abrasion test specified in ASTM D1044) and a falling sand abrasion test (specified in JIS T8147) although the pencil hardness can be improved by increasing the coating thickness of the radiation-curable resin. On the other hand, a radiation-curable resin having a large shrinkage on curing has excellent resistance to abrasion, such as Taber abrasion, although the warpage on shrinkage is large. Therefore, the provision of a hard layer of which the hardness continuously increases from the interface of the hard layer and the transparent protective layer toward the surface of the hard layer can suppress warpage and, at the same time, provides excellent pencil hardness and resistance to abrasion such as Taber abrasion. In addition, the bending strength is excellent because no interface is present in the hard layer as the surface layer.

The present invention will now be described with reference to the accompanying drawings.

Figure 4:
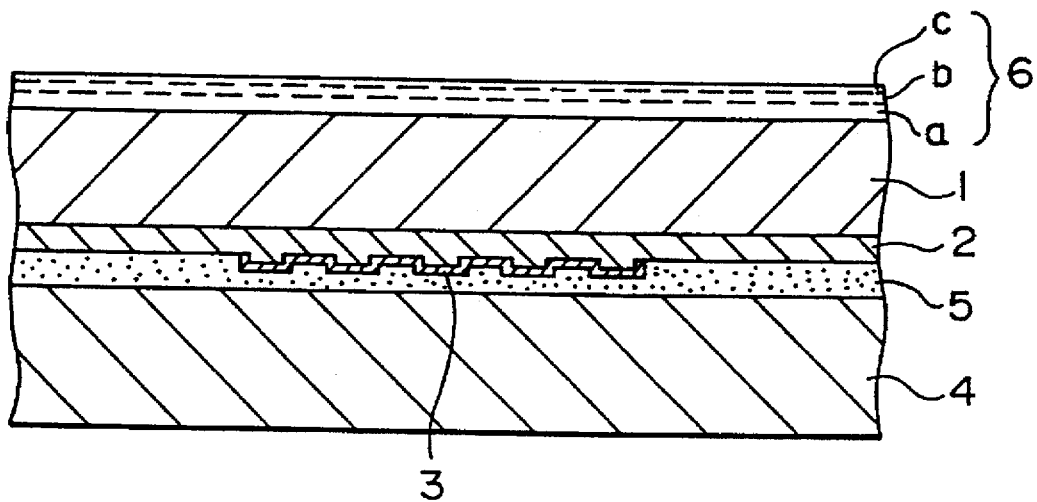

FIG. 4 is a cross-sectional view of an embodiment of an optical card which is one form of the optical recording medium of the present invention.

As shown in FIG. 4, the optical card has the following construction. A pattern layer 2 and an optical recording layer 3 covering grooves of the pattern layer 2 are provided on the undersurface of a transparent protective layer 1. A card substrate 4 is laminated through an adhesive layer 5 so as to sandwich the optical recording layer 3 between the card substrate 4 and the pattern layer 2. A hard layer 6 comprising a first layer a, a second layer b, and a third layer c is laminated on the transparent protective layer 1. In the formation of the hard layer 6, three curable resins different from one another in shrinkage on curing are simultaneously fed in such a manner that they are put on top of one another and the resultant layers are collectively cured to form a hard layer. This causes resins to be mixed together in the area of contact with each other, eliminating the interface of the resins. Therefore, the hardness of the hard layer continuously changes from the interface of the hard layer and the transparent protective layer toward the outer surface of the hard layer.

The resin used for constituting the transparent protective layer 1 preferably has good optical properties. Specifically, the use of a resin having a light beam transmittance of not less than 90% (780 nm, 830 nm), an optical retardation of not more than 100 nm (single pass), or an optical elastic axis of not more than ±5% is preferred. The total thickness of the transparent protective layer and the hard layer 6 is preferably about 380±20 μm. Among conventional resins commonly used in the art, a polycarbonate resin (PC) is particularly preferred, and it is also possible to use an acrylic resin having the above optical properties. For example, when 2P method is used for the formation of the pattern layer 2 on one side of the transparent protective layer, an extruded polycarbonate resin film, for example, Panlite Film manufactured by Teijin Ltd. or Lexan Film manufactured by GE, may be used. In this case, the interface between the layers 1 and 2 disappears by use of injection or casting method. The first layer a in the hard layer 6 is formed using a radiation-curable resin, having a low shrinkage on curing, containing a functional monomer and/or a functional oligomer. For example, when a 20 μm-thick layer is formed using a radiation-curable resin having a shrinkage on curing of 12.3% on a 0.4 mm-thick PC sheet having a size of 200 mm×200 mm and put on a desk, the warpage of the PC sheet becomes 4.5 mm. When a sheet process is used, a warpage of not less than 4 mm leads to a trouble in subsequent steps. Further, when a card is prepared from the laminate, the warpage of the PC sheet is taken over by the card and the warpage of the card becomes 2.2 mm. Such a card is below the standards and further has deteriorated optical properties. On the other hand, when a 20 μm-thick layer is formed using a radiation-curable resin having a shrinkage on curing of 11.9% in the same manner as described above and put on a desk, the warpage of the PC sheet becomes 4.0 mm. When a card is prepared from the laminate, the warpage of the card becomes 1.8 mm. This card satisfies standard requirements. For this reason, a radiation-curable resin having a shrinkage on curing of not more than 12% is used in the first layer a.

Examples of the functional monomer include polyfunctional acrylates including monofunctional acrylates, such as (2-ethylhexyl acrylate, 2-hydroxyethyl acrylate, 2-hydroxypropyl acrylate and the like), difunctional acrylates (1,3-butanediol diacrylate, 1,4-butanediol diacrylate, 1,6-hexanediol diacrylate, diethylene glycol diacrylate, neopentyl glycol diacrylate and the like), trifunctional acrylates (pentaerythritol triacrylate, trimethylolpropane triacrylate and the like), tetrafunctional acrylates (pentaerythritol tetraacrylate and the like), pentafunctional acrylates (dipentaerythritol pentaacrylate and the like), hexafunctional acrylates (dipentaerythritol hexaacrylate and the like), and penta- or higher functional acrylates (dipentaerythritol penta- and hexaacrylates and the like).

Examples of the functional oligomer include epoxy acrylate, urethane acrylate, polyester acrylate, polyether acrylate, silicone acrylate, unsaturated polyester, and polyene/thiol.

When the transparent protective layer 1 is formed of a polycarbonate resin, the functional monomer and/or functional oligomer are used in combination with N-vinylpyrrolidone as an agent for improving the adhesion to the polycarbonate and a reaction retardant, Irgacure 651, 184 or the like as an initiator (a benzoin, acetophenone, thioxanthone, peroxide or other initiator) and the like to prepare a radiation-curable resin having a shrinkage on curing of not more than 12%. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In general, the use of a polyfunctional acrylate is likely to increase the hardness, resulting in increased shrinkage on curing. The shrinkage on curing should be not more than 12% in order to form the first layer a in a thickness of not less than 20 μm i.e., a thickness large enough to avoid the influence of the underlying layer, and, at the same time, to provide a low warpage and to ensure satisfactory hardness. The pencil hardness is about 2H as measured on glass. The apparent thickness is most preferably about 25 to 30 μm.

The second layer b is formed using a radiation-curable resin of which the hardness and the shrinkage on curing are between those of the above first layer a and those of the third layer c described below. More specifically, a functional monomer and a functional oligomer may be selected so as for the shrinkage on curing of the radiation-curable resin to be about 12 to 15%. The pencil hardness is about 4H as measured on glass. The apparent thickness is preferably 10 to 20 μm.

In order to improve the appearance, a leveling agent may be added to the radiation-curable resins for the first layer a and the second layer b.

The third layer c is formed, on the second layer b, using a radiation-curable resin, having a relatively high shrinkage on curing, comprising a tri- to hexafunctional monomer as a main agent and a minor amount of a functional oligomer added to the main agent, because it should have hardness high enough to be used as a surface layer. When the transparent protective layer 1 is formed of a polycarbonate resin, it is preferred to add N-vinylpyrrolidone as an agent for improving the adhesion and a reaction retardant and an initiator and, at the same time, to add a leveling agent, such as a silicone, in an amount of 0.01 to 10 parts by weight based on 100 parts by weight of the solid matter. The leveling agent serves to reduce surface defects and, at the same time, to increase the apparent hardness because the slip property is improved. In order to improve the bending strength, the proportion of the functional oligomer may be increased. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. When the thickness of the third layer c is larger than 15 μm, the warpage of the optical card becomes large. Further, in this case, cracking occurs in a bending test, that is, the bending strength is unsatisfactory. On the other hand, when the thickness is less than 2 μm, the hardness is unsatisfactory. For this reason, the thickness is preferably 2 to 15 μm. However, a thickness of 2 to 10 μm is most preferred from the viewpoint of satisfying both the bending strength and hardness requirements. Further, in order to increase the bending strength, the resin used for constituting the second layer b may be, if necessary, added in an amount of 0 to about 30%. The pencil hardness is about 6 to 7H as measured on glass. The shrinkage on curing is regulated to not less than 15%.

An antistatic agent may be added to the first layer a, the second layer b, and the third layer c for antistatic purposes. The first layer a, the second layer b, and the third layer c are simultaneously formed by slide coating on the transparent protective layer 1. Specifically, these layers are extruded through a slide head and coated so as to be put on top of one another in a wet state. The first layer a, the second layer b, and the third layer c formed by coating are delicately mixed together in the course of air drying or thermodrying, and the interface of layers become apparently eliminated before radiation curing. Then, a radiation is applied to conduct curing. The elimination of the interface results in improved bending strength. The above coating may be carried out after dilution with a solvent to a suitable extent. Further, it is also possible to use curtain coating, slot coating or the like. Specific examples of the coating method are described in Japanese Patent Publication Nos. 8977/1958 and 12390/1970, Japanese Patent Laid-Open No. 115214/1977, and Japanese Patent Publication Nos. 22192/1988 and 18143/1990.

Although a hard layer 6 having a three-layer structure has been described in the present embodiment, the hard layer may have a two-, four-, or five-layer structure. In this case as well, the formation of layers for constituting the hard layer using radiation-curable resins in such a manner that the shrinkage on curing of the radiation-curable resins increases from the interface of the hard layer and the transparent protective layer 1 toward the outer surface of the hard layer enables the hardness of the cured surface to be increased while preventing the warpage of the card. Further, good bending strength can be ensured when the thickness of the layers constituting the hard layer is reduced from the innermost layer toward the outermost layer. Since the warpage of the card varies depending upon the shrinkage on curing and the thickness of the layers, the final layer construction may be determined using the shrinkage on curing and the thickness of the layers as parameters so as to minimize the warpage. The hardness may be evaluated according to, besides pencil hardness, any of drop abrasion, steel wool abrasion, Taber abrasion and the like.

Further, although the formation of the hard layer 6 using radiation-curable resins has been described, it is also possible to use other reaction-curable resins, such as silicone and melamine resins.

The pattern layer 2 provided on the undersurface of the transparent protective layer 1 may be generally formed by 2P, injection, casting, or other known methods. When the pattern layer 2 is formed by the 2P method, the resin used is a UV-curable resin. On the other hand, when the pattern layer 2 is formed by the injection or casting method, the resin used may be the same as that used in the transparent protective layer 1.

The optical recording layer 3 may be formed of a commonly used metallic optical recording material, such as a tellurium- or bismuth-based material. It may also be formed of a dye optical recording material, such as phthalocyanine- or naphthoquinone-based recording material. The optical recording layer may be of ROM type as well as write-once read-many type.

The card substrate 4 is formed of polyvinyl chloride, polyethylene terephthalate, ABS, polycarbonate, polypropylene or the like. In the case of the card substrate formed of polyvinyl chloride, the layer construction may be of any of a three-layer type of 0.05/0.20/0.05 mm, 0.05/0.24/0.05 mm, 0.05/0.26/0.05 mm, 0.05/0.30/0.05 mm or the like, a two-layer type of 0.20/0.10 mm, 0.24/0.10 mm, 0.26/0.10 mm, 0.30/0.10 mm or the like, a single layer type of 0.30 mm, 0.34 mm, 0.36 mm, or 0.40 mm, and the like. 0.10 mm-thick polyvinyl chloride and 0.05 mm-thick polyvinyl chloride are transparent. On the other hand, polyvinyl chloride having a thickness of not less than 0.20 mm is pearlescent. In order to enhance the abrasion resistance of a print, it is preferred for the card substrate to have a two- or three-layer structure prepared by conducting printing on a pearlescent polyvinyl chloride and heat-sealing a transparent polyvinyl chloride to the printed pearlescent polyvinyl chloride.

Known adhesives, such as urethane, epoxy, acrylic, vinyl, and amide adhesives, may be used as an adhesive for the adhesive layer 5. Since, however, the adhesive comes into direct contact with the optical recording layer 3, it preferably has high recording sensitivity and excellent temperature and moisture resistance. The thickness of the adhesive layer is preferably about 10 to 100 μm, and gravure coating, spin coating, knife coating, silk screen coating, Mayer bar coating, T-die coating or the like may be used to form the adhesive layer. The bonding is carried out by hot pressing using a flat press, a roll press or the like.

When the recording sensitivity of the optical recording layer 3 is unsatisfactory, a sensitizing layer may be provided between the optical recording layer 3 and the adhesive layer 5. The provision of the sensitizing layer is unnecessary when the recording sensitivity is satisfactory. The adhesive layer 5 is in contact with the optical recording layer 3. If the adhesive deteriorates the sensitivity of the optical recording layer 3, a transparent protective layer may be provided for avoiding this unfavorable phenomenon. When the sensitizing layer is provided, the transparent protective layer is provided between the sensitizing layer and the adhesive layer 5. However, the transparent protective layer may serve also as the sensitizing layer. When the adhesive layer is formed of a material which does not deteriorate the optical recording layer 3, there is no need to provide the transparent protective layer.

Further, in order to diversify the use of the card, a magnetic stripe may be provided on one side of the card substrate 4, which is the same as or opposite to the side where the optical recording member is provided, or both sides of the card substrate 4, and an IC module may be provided on one side of the card substrate 4 which is the same as or opposite to the side where the optical recording member is provided.

Fifth and Sixth Inventions

The optical recording medium according to the sixth aspect of the present invention comprises at least a transparent protective layer and an optical recording layer laminated on top of the other, the transparent protective layer bearing a multilayered hard layer, layers constituting the hard layer having been formed by using radiation-curable resins in such a manner that the shrinkage on curing of the radiation-curable resins for forming the layers successively increases from the innermost layer toward the outermost layer, all the layers, constituting the hard layer except for the innermost layer, containing at least one kinds of an organic polymer type leveling agent.

The radiation-curable resin comprises a functional monomer and/or a functional oligomer. Examples of the functional monomer include polyfunctional acrylates including monofunctional acrylates, such as (2-ethylhexyl acrylate, 2-hydroxyethyl acrylate, 2-hydroxypropyl acrylate and the like), difunctional acrylates (1,3-butanediol diacrylate, 1,4-butanediol diacrylate, 1,6-hexanediol diacrylate, diethylene glycol diacrylate, neopentyl glycol diacrylate and the like), trifunctional acrylates (pentaerythritol triacrylate, trimethylolpropane triacrylate and the like), tetrafunctional acrylates (pentaerythritol tetraacrylate and the like), pentafunctional acrylates (dipentaerythritol pentaacrylate and the like), hexafunctional acrylates (dipentaerythritol hexaacrylate and the like), and penta- or higher functional acrylates (dipentaerythritol penta- and hexaacrylates and the like). Examples of the functional oligomer include epoxy acrylate, urethane acrylate, polyester acrylate, polyether acrylate, silicone acrylate, unsaturated polyester, and polyene/thiol.

The organic polymer type leveling agent used in the present invention should be excellent in leveling function, as well as in adhesion. The term "leveling function" used herein is intended to mean that irregularities created on the coated surface is flattened with time. The organic polymer type leveling agent is effective also in preventing wrinkling, pinholes, foaming, dewetting, recessing, depression, cracking, raising, cratering and the like.

The addition of a convectional silicone oil or the like to the coating solution causes the silicone oil to gather on the surface of the coating solution to form a kind of a barrier layer which offers favorable effects, that is, serves to make the evaporation of the solvent homogeneous and, at the same time, to lower the surface tension. Since, however, the sole use of the silicone oil results in lowered adhesion, it is preferred to use the silicone oil in combination with the organic polymer type leveling agent.

In the present invention, a preferred organic polymer type leveling agent can be dissolved in the radiation-curable resin and lower the surface tension of the radiation-curable resin and does not deteriorate the adhesion. For this reason, preferred organic polymer type leveling agents in the present invention include polyvinyl butyral, and low-molecular weight cellulose. Such organic polymer rises the viscosity of the coating composition whereby foaming due to dynamic viscosity can effectively be prevented. Further, internal curing type silicone and fluorine-modified copolymer can also be used for this purpose although these silicones has lower adhesiveness than ordinary polymers.

Typical internal curing type silicones include silicone acrylates, and specific examples thereof include acrylsilane and methacrylsilane, acrylsilicone and methacrylsilicone, and phenylsilicone acrylate and m-phenylsilicone acrylate. More specific examples thereof include acryloxypropylmethyldimethoxysilane, acryloxypropyltrimethoxysilane, methacryloxypropylmethyldimethoxysilane, and methacryloxypropyltrimethoxysilane.

The so-called "surfactant" or the like may be used as the organic polymer type leveling agent. Since, however, this serves to lower the surface tension, solvents used are limited and, for example, aqueous coating, such as alcoholic or emulsion coating, are necessary. More specifically, organic polymer type leveling agents usable in this case include those manufactured by Miyoshi Oil & Fat Co., Ltd., Toho Chemical Industry Co., Ltd., and Nippon Oils & Fats Co., Ltd.

When other organic solvent systems are used, polymers silicone-modified copolymers, fluorine-modified copolymers and the like may be used as the organic polymer type leveling agent. Specific examples thereof include Chaline Series manufactured by Nissin Chemical Industry Co., Ltd. Further, low-molecular weight cellulose and the like are also effective as the organic polymer leveling agent contemplated herein. Further, Talen, Flowlen, and Polyflow, which are organic copolymers, manufactured by Kyoeisha Chemical Co., Ltd. are also effective. Two or more kinds of the organic polymer leveling agent can also be used in combination. An internal curing type silicone can preferably be added in addition to a low molecular cellulose.

The addition of the above organic polymer type leveling agent in an amount of about 0.01 to 10 parts based on 100 parts by weight of the solid content of the radiation-curable resin suffices for attaining the effect of the organic polymer type leveling agent. If the amount of the organic polymer type leveling agent added exceeds 10 parts by weight, the adhesion is deteriorated, while if it is less than 0.01 part by weight, no leveling effect can be attained.

When no significant change in surface tension can be attained by the addition of the organic polymer type leveling agent, as described above, a suitable amount of a silicone may be added in addition to the organic polymer type leveling agent. In this connection, it should be noted that the addition of these agents in an excessive amount is likely to cause surface defects, such as dewetting, if a raw film for the transparent protective layer has a defect. Therefore, in general, it is preferred to use the organic polymer type leveling agent in combination with the silicone. The proportions of the organic polymer type leveling agent and the silicone may be determined by taking into consideration the surface tension and the surface defect in the formation of the outer layer.

Regarding the outermost layer in the hard layer, there is no need to take the adhesion into consideration. Basically, consideration to leveling suffices for the outermost layer, and a silicone may be added for this purpose. It is also possible to add an organic polymer type leveling agent or to add the organic polymer type leveling agent in combination with the silicone. The addition of the silicone can improve the slip property, resulting in increased apparent hardness. Although some organic polymer type leveling agents too can improve the slip property, they are basically inferior to the silicone in improvement in slip property. The organic polymer type leveling agent, however, is superior to the silicone in resistance to high viscous soils derived from fingerprints and the like. Therefore, one of the silicone and the organic polymer type leveling agent or a combination of the silicone with the organic polymer type leveling agent are selected by taking into consideration the necessary slip property and resistance to soils which vary depending upon applications of the optical recording medium. Silicones modified with dimethyl polysiloxane polyether are preferred as the silicone.

The use of a radiation-curable resin having a low shrinkage on curing enables the warpage of the transparent protective layer to be suppressed on a small level even though the radiation-curable resin is coated in a large thickness on the transparent protective layer. Therefore, in this case, coating may be carried out in a thickness large enough to avoid the influence of the underlying transparent protective layer in a pencil hardness test. The coating in such a thickness can provide a pencil hardness of H to 2H. The radiation-curable resin having a low shrinkage on curing is flexible. Since, however, it as such is soft, the hard layer formed using such a resin has low resistance to abrasion such as Taber abrasion (a Taber abrasion test specified in ASTM D1044) and a falling sand abrasion test (specified in JIS T8147) although the pencil hardness can be improved by increasing the coating thickness of the radiation-curable resin. On the other hand, a radiation-curable resin having a large shrinkage on curing has excellent resistance to abrasion, such as Taber abrasion, although the warpage on shrinkage is large. Therefore, the provision of a multilayered hard layer comprising layers formed by using radiation-curable resins in such a manner that the shrinkage on curing of the radiation-curable resins successively increases from the innermost layer toward the outermost layer can offer an optical recording medium which has a lowered warpage and, by virtue of synergistic effect of the layers constituting the hard layer, has excellent pencil hardness and resistance to abrasion such as Taber abrasion.

The radiation-curable resin has a molecular weight of about several thousands though it is an oligomer, and since the molecular weight of the organic polymer is larger than that of the radiation-curable resin, the addition of an organic polymer type leveling agent results in the prevention of dewetting during coating. Therefore, the addition of an organic polymer type leveling agent or an organic polymer type leveling agent in combination with a silicone to at least radiation-curable resins for forming all the layers constituting the hard layer except for the outermost layer enables the radiation-curable resins to be satisfactorily coated and adhered to the underlying layer without dewetting even when a raw film for the transparent protective layer has distortion, deflection, protrusion, foreign matter and the like. In addition, the adhesion between the layers is improved, and the occurrence of surface defect is reduced. Regarding the outermost layer in the hard layer, an organic polymer type leveling agent or a silicone or a combination of the organic polymer type leveling agent with the silicone may be optionally added to improve the slip property and the resistance to soils. Further, the combination of a low molecular cellulose and an internal curing type silicone can be used in addition to the silicone.

The present invention will now be described in more detail.

FIG. 3 is a cross-sectional view of an embodiment of an optical card which is one form of the optical recording medium of the present invention.

As shown in FIG. 3, the optical card has the following construction. A pattern layer 2 and an optical recording layer 3 covering grooves of the pattern layer 2 are provided on the undersurface of a transparent protective layer 1. A card substrate 4 is laminated through an adhesive layer 5 so as to sandwich the optical recording layer 3 between the card substrate 4 and the pattern layer 2. A hard layer 9, having a three-layer structure, of a first layer 6a, a second layer 7, and a third layer 8 is laminated on the transparent protective layer 1.

The resin used for constituting the transparent protective layer 1 preferably has good optical properties. Specifically, the use of a resin having a light beam transmittance of not less than 90% (780 nm, 830 nm), an optical retardation of not more than 100 nm (single pass), or an optical elastic axis of not more than ±5% is preferred. The total thickness of the transparent protective layer and the hard layer 9 is preferably about 380±20 μm. Among conventional resins commonly used in the art, a polycarbonate resin (PC) is particularly preferred, and it is also possible to use an acrylic resin having the above optical properties. For example, when 2P is used for the formation of the pattern layer 2 on one side of the transparent protective layer, an extruded polycarbonate resin film, for example, Panlite Film manufactured by Teijin Ltd. or Lexan Film manufactured by GE, may be used. In this case, the interface between layers 1 and 2 disappears by use of injection or casting method.

The first layer 6a in the hard layer 9 is formed in a thickness of not less than 20 μm using a radiation-curable resin, having a low shrinkage on curing, containing a functional monomer and/or a functional oligomer and, as an additive, an organic polymer type leveling agent or a combination of an organic polymer type leveling agent with at least either an internal curing type silicone or a silicone on the transparent protective layer 1. For example, when a 20 μm-thick layer is formed using a radiation-curable resin having a shrinkage on curing of 12.3% on a 0.4 mm-thick PC sheet having a size of 200 mm ×200 mm and put on a desk, the warpage of the PC sheet becomes 4.5 mm. When a sheet process is used, a warpage of not less than 4 mm leads to a trouble in subsequent steps. Further, when a card is prepared from the laminate, the warpage of the PC sheet is taken over by the card and the warpage of the card becomes 2.2 mm. Such a card does not meet standard requirements and further has deteriorated optical properties. On the other hand, when a 20 μm-thick layer is formed using a radiation-curable resin having a shrinkage on curing of 11.9% in the same manner as described above and put on a desk, the warpage of the PC sheet becomes 4.0 mm. When a card is prepared from the laminate, the warpage of the card becomes 1.8 mm. This card satisfies standard requirements. For this reason, a radiation-curable resin having a shrinkage on curing of not more than 12% is used in the present embodiment.

When the transparent protective layer 1 is formed of a polycarbonate resin, the functional monomer and/or functional oligomer are used in combination with N-vinylpyrrolidone as an agent for improving the adhesion to the polycarbonate and a reaction retardant, Irgacure 651, 184 or the like as an initiator (a benzoin, acetophenone, thioxanthone, peroxide or other initiator) and the like, and an organic polymer type leveling agent or a combination of an organic polymer type leveling agent with at least either an internal curing type silicone or a silicone is added thereto to prepare a radiation-curable resin having a shrinkage on curing of not more than 12%. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In general, the use of a polyfunctional acrylate is likely to increase the hardness, resulting in increased shrinkage on curing. The shrinkage on curing should be not more than 12% in order to form the first layer 6a in a thickness of not less than 20 μm, i.e., a thickness large enough to avoid the influence of the underlying layer, and, at the same time, to provide a low warpage and to ensure satisfactory hardness. A thickness of about 25 to 30 μm is most preferred.

The second layer 7 is formed using a radiation-curable resin of which the hardness and the shrinkage on curing are between those of the above first layer 6a and those of the third layer 8 described below. More specifically, a functional monomer and a functional oligomer may be selected so as for the shrinkage on curing of the radiation-curable resin to be about 12 to 15%.

An organic polymer type leveling agent or a combination of an organic polymer type leveling agent with at least either an internal curing type silicone or a silicone is added also to the radiation-curable resin for forming the second layer 7. A thickness of 10 to 20 μm is most preferred for the second layer 7.

The third layer 8 is formed, on the second layer 7, using a radiation-curable resin, having a relatively high shrinkage on curing, comprising a tri- to hexafunctional monomer as a main agent and a minor amount of a functional oligomer added to the main agent, because it should have hardness high enough to be used as a surface layer. An organic polymer type leveling agent, a conventional silicone, or a combination of an organic polymer type leveling agent with a conventional silicone may be added to the radiation-curable resin for forming the outermost layer. The leveling agent, when added in this manner, serves to improve the adhesion to the second layer 7, reduce surface defects and, at the same time, increase the apparent hardness because the slip property is improved. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In order to improve the bending strength, the proportion of the functional oligomer may be increased. In some cases, the resin used for constituting the second layer 7 may be incorporated in an amount of 0 to about 30%. Further, the shrinkage on curing of the radiation-curable resin used is regulated to not less than 15%. When the thickness of the third layer 8 is larger than 15 μm, the warpage of the optical card becomes large. Further, in this case, cracking occurs in a bending test, that is, the bending strength is unsatisfactory. On the other hand, when the thickness is smaller than 2 μm, the hardness is unsatisfactory. For this reason, the thickness is preferably 2 to 15 μm. However, a thickness of 2 to 5 μm is most preferred from the viewpoint of satisfying both the bending strength and hardness requirements.

An antistatic agent may be added to the first layer 6a, the second layer 7, and the third layer 8 constituting the hard layer 9 for antistatic purposes. The first layer 6a, the second layer 7, and the third layer 8 may be formed by gravure coating, roll coating, Komma coating, spin coating, knife coating, silk screen coating, T-die coating, slide coating, slit reverse coating or the like. In this case, coating may be carried out after dilution with a solvent to a suitable extent. It should be noted that the first layer 6a and the second layer 7 may be formed by multicoat coating to have a multilayer structure.

When a conventional radiation-curable resin is coated by the above coating method, the leveling is unsatisfactory, resulting in many surface defects. The use of a silicone as a leveling agent is generally considered for preventing this unfavorable phenomenon. The addition of the conventional silicone to the first layer 6a and the second layer 7 causes the silicone to bleed on the surface of the layer, deteriorating the adhesion. Further, when a silicone is added in a small amount, the surface tension is not lowered, making it impossible for the silicone to serve as the leveling agent, although the wetting property is not deteriorated in subsequent steps. As described above, according to the present invention, these problems can be solved by adding an organic polymer type leveling agent or adding a combination of an organic polymer type leveling agent with a silicone. Regarding the third layer 8 as the outermost layer, as described above, the addition of an organic polymer type leveling agent or a conventional silicone or the addition of an organic polymer type leveling agent with a conventional silicone is preferred in order to avoid the occurrence of surface defects or to improve the slip property of the surface of the layer.

Although a hard layer 9 having a three-layer structure has been described in the present embodiment, the hard layer may have a two-, four-, or five-layer structure. In this case as well, the formation of layers for constituting the hard layer using radiation-curable resins in such a manner that the shrinkage on curing of the radiation-curable resins increases from the innermost layer toward the outermost layer enables the hardness of the cured surface to be increased while preventing the warpage of the card. Further, good bending strength can be ensured when the thickness of the layers constituting the hard layer is reduced from the innermost layer toward the outermost layer. Since the warpage of the card varies depending upon the shrinkage on curing and the thickness of the layers, the final layer construction may be determined using the shrinkage on curing and the thickness of the layers as parameters so as to minimize the warpage.

The pattern layer 2 provided on the undersurface of the transparent protective layer 1 may be generally formed by 2P, injection, casting, or other known methods. When the pattern layer 2 is formed by the 2P method, the resin used is a UV-curable resin. On the other hand, when the pattern layer 2 is formed by the injection or casting method, the resin used may be the same as that used in the transparent protective layer 1. In this case, the interface between the layers 1 and 2 disappears by use of injection or casting method.

The optical recording layer 3 may be formed of a commonly used metallic optical recording material, such as a tellurium- or bismuth-based material. It may also be formed of a dye optical recording material, such as phthalocyanine- or naphthoquinone-based recording material. The optical recording layer may be of ROM type as well as write-once read-many type.

The card substrate 4 is formed of polyvinyl chloride, polyethylene terephthalate, acrylic styrene (AS), ABS, polycarbonate, ABS, polypropylene or the like. In the case of the card substrate formed of polyvinyl chloride, the layer construction may be of any of a three-layer type of 0.05/ 0.20/0.05 mm, 0.05/0.24/0.05 mm, 0.05/0.26/0.05 mm, 0.05/0.30/0.05 mm or the like, a two-layer type of 0.20/0.10 mm, 0.24/0.10 mm, 0.26/0.10 mm, 0.30/0.10 mm or the like, a single layer type of 0.30 mm, 0.34 mm, 0.36 mm, or 0.40 mm, and the like. 0.10 mm-thick polyvinyl chloride and 0.05 mm-thick polyvinyl chloride are transparent. On the other hand, polyvinyl chloride having a thickness of not less than 0.20 mm is pearlescent. In order to enhance the abrasion resistance of a print, it is preferred for the card substrate to have a two- or three-layer structure prepared by conducting printing on a pearlescent polyvinyl chloride and a transparent polyvinyl chloride is heat-sealed to the printed pearlescent polyvinyl chloride.

Known adhesives, such as urethane, epoxy, acrylic, vinyl, and amide adhesives, may be used as an adhesive for the adhesive layer 5. Since, however, the adhesive comes into direct contact with the optical recording layer 3, it preferably has high recording sensitivity and excellent temperature and moisture resistance. The thickness of the adhesive layer is preferably about 10 to 100 µm, and gravure coating, spin coating, knife coating, silk screen coating, Mayer bar coating, T-die coating or the like may be used to form the adhesive layer. The bonding is carried out by hot pressing using a flat press, a roll press or the like.

When the recording sensitivity of the optical recording layer 3 is unsatisfactory, a sensitizing layer may be provided between the optical recording layer 3 and the adhesive layer 5. The provision of the sensitizing layer is unnecessary when the recording sensitivity is satisfactory. The adhesive layer 5 is in contact with the optical recording layer 3. If the adhesive deteriorates the sensitivity of the optical recording layer 3, a transparent protective layer may be provided for avoiding this unfavorable phenomenon. When the sensitizing layer is provided, the transparent protective layer is provided between the sensitizing layer and the adhesive layer 5. However, the transparent protective layer may serve also as the sensitizing layer. When the adhesive layer is formed of a material which does not deteriorate the optical recording layer 3, there is no need to provide the transparent protective layer.

Further, in order to diversify the use of the card, a magnetic stripe may be provided on one side of the card substrate 4, which is the same as or opposite to the side where the optical recording member is provided, or both sides of the card substrate 4, and an IC module may be provided on one side of the card substrate 4 which is the same as or opposite to the side where the optical recording member is provided.

Seventh Invention

As described above, a surface hard layer is, if necessary, provided on the top surface of the transparent protective layer 1 for the purpose of preventing the creation of flaws during carrying or during use, thereby improving the durability of the card and the reliability of the writing and reading accuracy. The surface hard layer is, in many cases, formed using a radiation-curable resin.

In such an optical card, an additive, such as a silicone, is often added to the surface hard layer in order to increase the apparent hardness of the surface hard layer. In this case, when the provision of a magnetic stripe on the surface of the optical card is contemplated, the magnetic stripe cannot be successfully adhered due to lowered adhesion. Further, when the proportion of a polyfunctional monomer capable of providing a high surface hardness is increased without adding any additive such as a silicone, the adhesion of the magnetic stripe to the surface of the hard layer is not always good. Furthermore, in this case, since a magnetic stripe is formed on the card surface, the magnetic stripe is protruded on the card surface, deteriorating the appearance of the card. When a magnetic stripe is provided on the transparent protective layer and a surface hard layer is formed thereon, the thickness of the surface hard layer on the magnetic stripe should be about 10 µm at the largest in consideration of the output of magnetism. The 10 µm thickness however does not provide satisfactory surface hardness in the optical card.

The present invention has been made under the above circumstances and provides an optical card provided with a magnetic stripe, which has excellent scratch resistance, causes neither warpage nor cracking by bending, and has excellent smoothness. The optical card of the present invention comprises: a card substrate; and, laminated on the card substrate, an optical recording member comprising a laminate of at least a transparent protective layer and an optical recording layer, a magnetic stripe being provided on the transparent protective layer side. A multilayered surface hard layer may be provided on the transparent protective layer formed of a radiation-cured resin, and in this case, the magnetic stripe may be provided on the surface hard layer.

Specifically, a magnetic stripe may be provided on a layer other than the outermost layer in the surface hard layer or alternatively on the transparent protective layer. In any case, it is preferred that the outermost layer in the surface hard layer and the magnetic stripe constitute an identical face, that is, the surface of the outermost layer in the surface hard layer and the surface of the area where the magnetic stripe is present constitute an identical surface and no difference in level exist in the boundary between the surface hard layer and the surface of the area where the magnetic stripe is present.

Figure 5A:
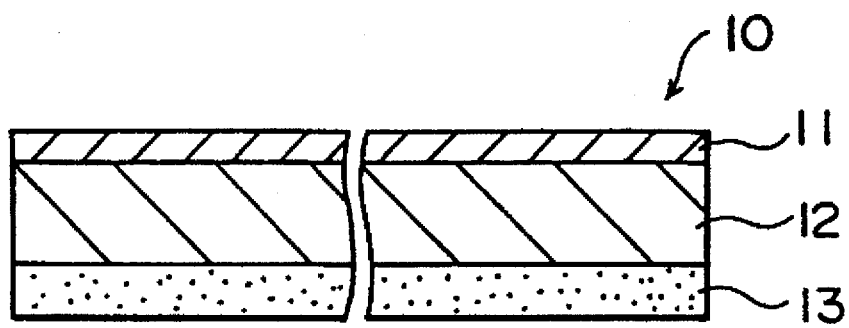
FIGS. 5A and 5B are cross-sectional views showing conventional magnetic stripes.
Figure 5B:
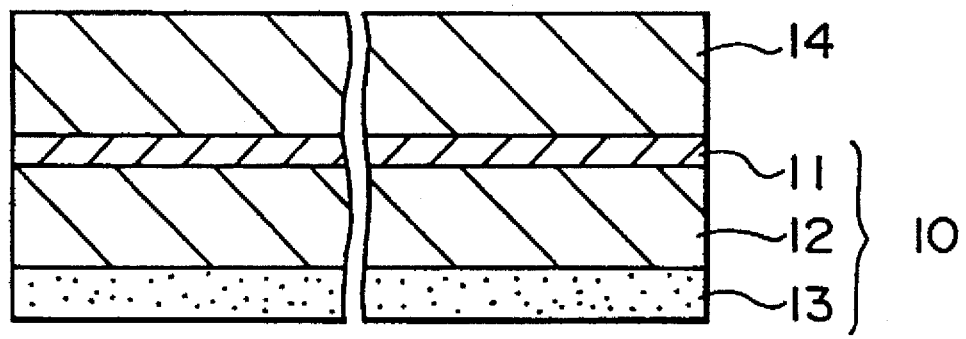

The magnetic stripe may be any one commonly used in the conventional magnetic cards. As shown in FIG. 5A, a magnetic stripe 10 generally comprises a release layer 11, a magnetic layer 12, and an adhesive layer 13 provided in that order. A typical method for forming the magnetic stripe is as follows. As shown in FIG. 5B, after the release layer 11, the magnetic layer 12, and the adhesive layer 13 are formed on a substrate 14, the resultant laminate is slit into a predetermined width. The adhesive layer 12 of slit laminate is abutted against and heat-sealed to an adherend, and the substrate 14 is then peeled off.

The substrate 14 is not particularly limited and may be any substrate commonly used in the conventional transfer sheet. Preferred specific examples of the substrate include films having high heat resistance, such as films of a polyester resin, a polyamide resin, a polyimide resin, and a polycarbonate. The thickness of the substrate is preferably about 1 to 300 µm.

The release layer 11 is formed of a release agent, such as a wax, a silicone wax, a silicone resin, a fluororesin, an acrylic resin. The release layer 11 may be formed by coating an ink of the above resin and necessary additives dissolved or dispersed in a suitable solvent onto the substrate 10 by known coating means and then drying the coating. The thickness of the release layer 11 is preferably about 0.5 to 5 µm.

Examples of magnetic materials for constituting the magnetic layer 12 include magnetic fine particles of $\gamma\text{-}Fe_2O_3$, Co-coated $\gamma\text{-}Fe_2O_3$, $Fe_3O_4$, Fe, Fe—Cr, Fe—Co, Co—Cr, Co—Ni, Ba ferrite, Sr ferrite and the like. The magnetic layer 12 may be formed by coating a dispersion of the magnetic fine particles in a suitable resin or an ink vehicle by a known coating method such as gravure, roll, or knife edge coating. Examples of the resin or ink vehicle in which the magnetic fine particles are dispersed include butyral resin, vinyl chloride/vinyl acetate copolymer resin, urethane resin, polyester resin, cellulose resin, acrylic resin, styrene/malic acid copolymer resin. If necessary, rubbery resin, such as nitrile resin, urethane elastomer or the like may be added thereto. Further, if necessary, a surfactant, a silane coupling agent, a plasticizer, a wax, a silicone oil, a pigment, such as carbon, may be added to the dispersion of magnetic fine particles in a resin or an ink vehicle. The thickness of the magnetic layer 12 formed by using the magnetic material, the resin or the ink vehicle is 1 to 100 µm, preferably about 5 to 20 µm. Alternatively, the magnetic layer 12 may be formed by vacuum deposition, sputtering, plating or other method using a metal or an alloy, such as Fe, Fe—Cr, Fe—Co, or Co—Cr or an oxide of the above metal or alloy. The thickness is 100 Å to 1 µm, preferably about 500 to 2000 Å.

The adhesive layer 13 may be formed of any conventional adhesive such as an acrylic resin, a vinyl resin, a polyester resin, a urethane resin, an amide resin, an epoxy resin, a rubbery resin, or an ionomer resin. The thickness of the adhesive layer 13 is 0.1 to 5 µm, preferably about 1 to 10 µm.

The radiation-curable resin for forming each layer constituting the surface hard layer comprises a functional monomer and/or a functional oligomer. Examples of the functional monomer include polyfunctional acrylates including monofunctional acrylates, such as (2-ethylhexyl acrylate, 2-hydroxyethyl acrylate, 2-hydroxypropyl acrylate and the like), difunctional acrylates (1,3-butanediol diacrylate, 1,4-butanediol diacrylate, 1,6-hexanediol diacrylate, diethylene glycol diacrylate, neopentyl glycol diacrylate and the like), trifunctional acrylates (pentaerythritol triacrylate, trimethylolpropane triacrylate and the like), tetrafunctional acrylates (pentaerythritol tetraacrylate and the like), pentafunctional acrylates (dipentaerythritol pentaacrylate and the like), hexafunctional acrylates (dipentaerythritol hexaacrylate and the like), and penta- or higher functional acrylates (dipentaerythritol penta- and hexaacrylates and the like). Examples of the functional oligomer include epoxy acrylate, urethane acrylate, polyester acrylate, polyether acrylate, silicone acrylate, unsaturated polyester, and polyene/thiol.

Preferably, at least an organic polymer type leveling agent is added to all the layers constituting the surface hard layer except for the outermost layer. The reason for this is that although the use of a leveling agent is indispensable in order to minimize surface defects, the addition of a suitable amount of a conventional silicone results in remarkably deteriorated adhesion of each layer in the surface hard layer.

The organic polymer type leveling agent is as described above, and it is very important for the selected organic polymer type leveling agent to be soluble in the radiation-curable resin, to lower the surface tension of the radiation-curable resin, and not to lower the adhesion. The so-called "surfactant" or the like may be used as the organic polymer type leveling agent. Since, however, this serves to lower the surface tension, solvents used are limited and, for example, aqueous coating, such as alcoholic or emulsion coating, are necessary. More specifically, organic polymer type leveling agents usable in this case include those manufactured by Miyoshi Oil & Fat Co., Ltd., Toho Chemical Industry Co., Ltd., and Nippon Oils & Fats Co., Ltd. When other organic solvent systems are used, silicone-modified copolymers, fluorine-modified copolymers and the like may be used as the organic polymer type leveling agent. Specific examples thereof include Chaline Series manufactured by Nissin Chemical Industry Co., Ltd. Further, low-molecular weight cellulose and the like are also effective as the organic polymer leveling agent contemplated herein. Further, Talen, Flowlen, and Polyflow, which are organic copolymers, manufactured by Kyoeisha Chemical Co., Ltd. are also effective.

The addition of the above organic polymer type leveling agent in an amount of about 0.01 to 10 parts based on 100 parts by weight of the solid content of the radiation-curable resin suffices for attaining the effect of the organic polymer type leveling agent. If the amount of the organic polymer type leveling agent added exceeds 10 parts by weight, the adhesion is deteriorated, while if it is less than 0.01 part by weight, no leveling effect can be attained.

When no significant change in surface tension can be attained by the addition of the organic polymer type leveling agent alone, a suitable amount of a silicone may be added. In this connection, it should be noted that the addition of these agents in an excessive amount is likely to cause surface defects, such as dewetting, in the formation of a layer overlying the layer, to which the silicone has been added, or deteriorated adhesion to a magnetic stripe if a raw film for the transparent protective layer has a defect. In general, it is preferred to use the organic polymer type leveling agent in combination with at least either the internal curing type leveling agent or the silicone. The proportions of the organic polymer type leveling agent and silicone may be determined by taking into consideration the surface tension, the surface defect in the formation of the outer layer, and the adhesion to the magnetic stripe.

Regarding the outermost layer in the surface hard layer, there is no need to take the adhesion of the outer layer and the magnetic stripe into consideration. Basically, consideration to leveling suffices for the outermost layer, and a silicone may be added for this purpose. It is also possible to add an organic polymer type leveling agent or to add the organic polymer type leveling agent in combination with the silicone. The addition of the silicone can improve the slip property, resulting in increased apparent hardness. Although some organic polymer type leveling agents too can improve the slip property, they are basically inferior to the silicone in improvement in slip property. The organic polymer type leveling agent, however, is superior to the silicone in resistance to high viscous soils derived from fingerprints and the like. Therefore, one of the silicone and the organic polymer type leveling agent or a combination of the silicone with the organic polymer type leveling agent are selected by taking into consideration the necessary slip property and resistance to soils which vary depending upon applications of the optical recording medium.

In the optical card having the above construction, the thickness of the surface hard layer provided on the magnetic stripe greatly has an effect on the output of magnetism. Although the selection of the material per se for constituting the magnetic layer 12 is important, the thickness of the surface of the surface hard layer on the magnetic stripe is preferably not more than 10 μm. The layer construction of the surface hard layer may be determined by taking into consideration the output of magnetism, surface hardness, and bending strength.

The use of a radiation-curable resin having a low shrinkage on curing enables the warpage of the transparent protective layer to be suppressed on a small level even though the radiation-curable resin is coated in a large thickness on the transparent protective layer. Therefore, in this case, coating may be carried out in a thickness large enough to avoid the influence of the underlying transparent protective layer in a pencil hardness test. The coating in such a thickness can provide a pencil hardness of H to 2H. The radiation-curable resin having a low shrinkage on curing is flexible. Since, however, it as such is soft, the hard layer formed using such a resin has low resistance to abrasion such as Taber abrasion (a Taber abrasion test specified in ASTM D1044) and a falling sand abrasion test (specified in JIS T8147) although the pencil hardness can be improved by increasing the coating thickness of the radiation-curable resin. On the other hand, a radiation-curable resin having a large shrinkage on curing has excellent resistance to abrasion, such as Taber abrasion, although the warpage on shrinkage is large. Therefore, the provision of a multilayered hard layer comprising layers formed by using radiation-curable resins in such a manner that the shrinkage on curing of the radiation-curable resins successively increases from the innermost layer toward the outermost layer can offer an optical card which has a lowered warpage and, by virtue of synergistic effect of the layers constituting the hard layer, has excellent pencil hardness and resistance to abrasion such as Taber abrasion.

The radiation-curable resin has a molecular weight of about several thousands though it is an oligomer, and since the molecular weight of the organic polymer is larger than that of the radiation-curable resin, the addition of an organic polymer type leveling agent results in the prevention of dewetting during coating. Therefore, the addition of an organic polymer type leveling agent or a combination of an organic polymer type leveling agent with a silicone to at least radiation-curable resins for forming all the layers constituting the hard layer except for the outermost layer enables the radiation-curable resins to be satisfactorily coated and adhered to the underlying layer without dewetting even when a raw film for the transparent protective layer has distortion, deflection, protrusion, foreign matter and the like. In addition, the adhesion between the layers is improved, and the occurrence of surface defect is reduced. Regarding the outermost layer in the hard layer, an organic polymer type leveling agent or a silicone or a combination of the organic polymer type leveling agent with the silicone may be optionally added to improve the slip property and the resistance to soils.

Further, for the layers constituting the surface hard layer except for the outermost layer, the adhesion in the formation of an outer layer is taken into consideration, making it possible to provide a magnetic stripe on these layers. Further, the selection of a suitable method for forming the outermost layer enables the outermost layer and the magnetic stripe to be provided so as to constitute an identical face or alternatively the magnetic stripe to be embedded in the surface hard layer. The adoption of such a layer construction can provide an optical card which has a magnetic stripe on the transparent protective layer side and possesses excellent surface hardness and bending strength and good surface smoothness and appearance.

Embodiments of the present invention will now be described in more detail with reference to the accompanying drawings.

Figure 6:
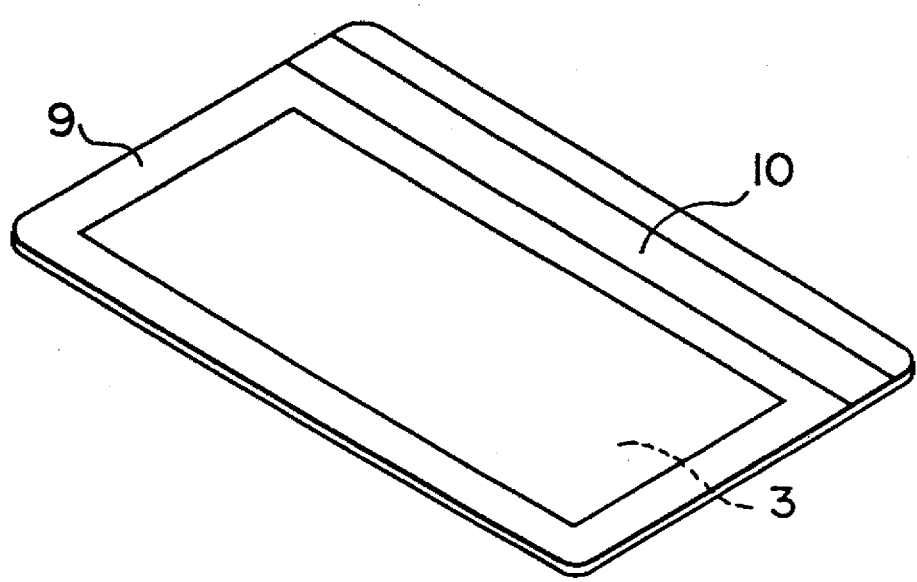
FIGS. 6 and FIGS. 16 to 18 are cross-sectional views of optical cards according to embodiments of the present invention.
Figure 7:
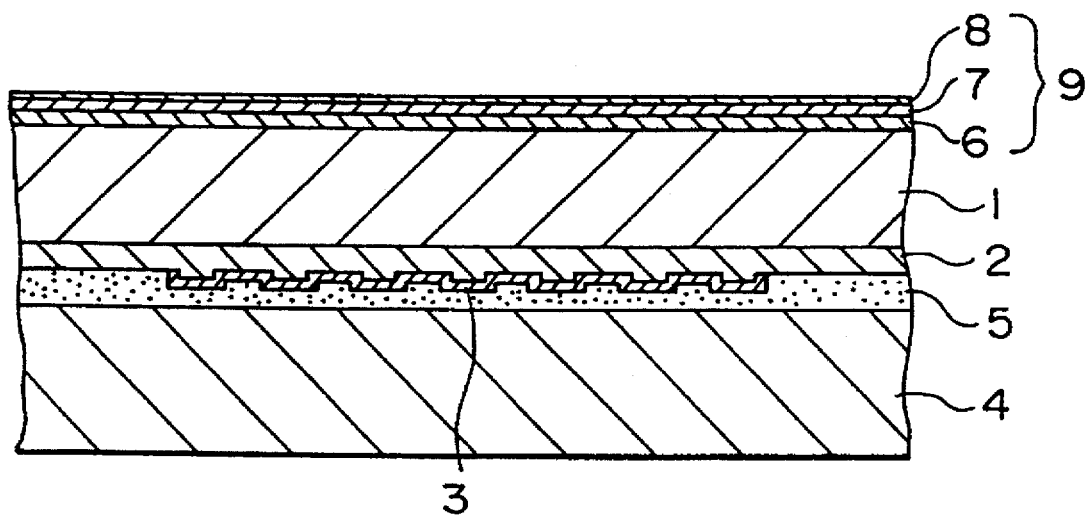
Figure 8:
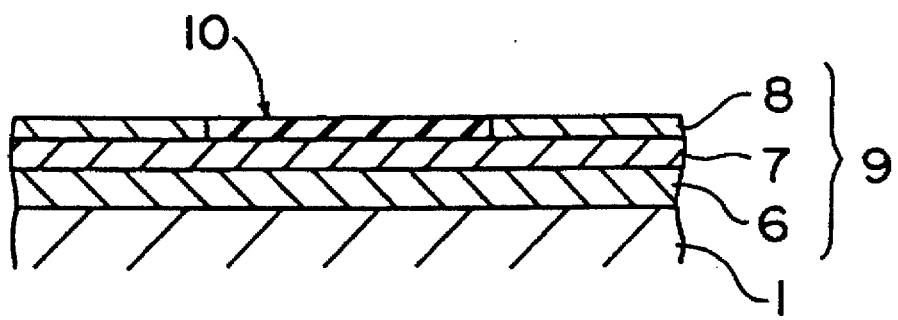
FIGS. 8 to 15 are cross-sectional views of optical cards each provided with a magnetic stripe.
Figure 9:
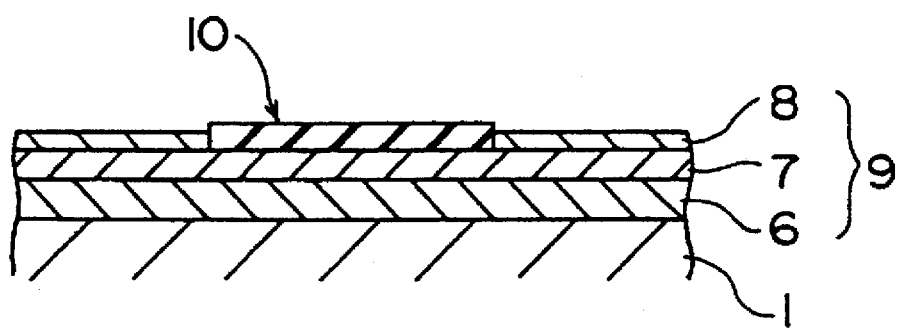
Figure 10:
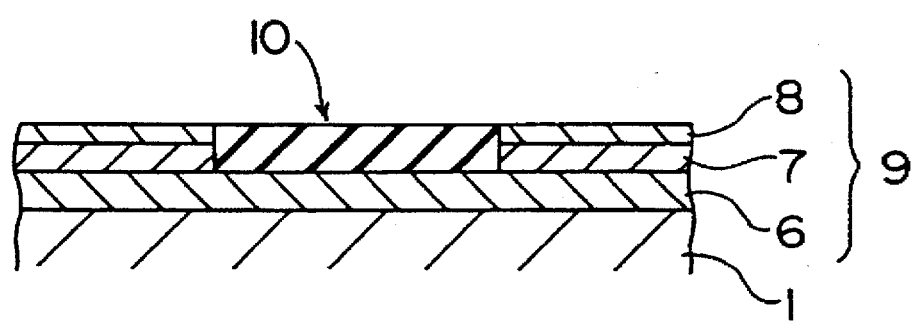
Figure 11:
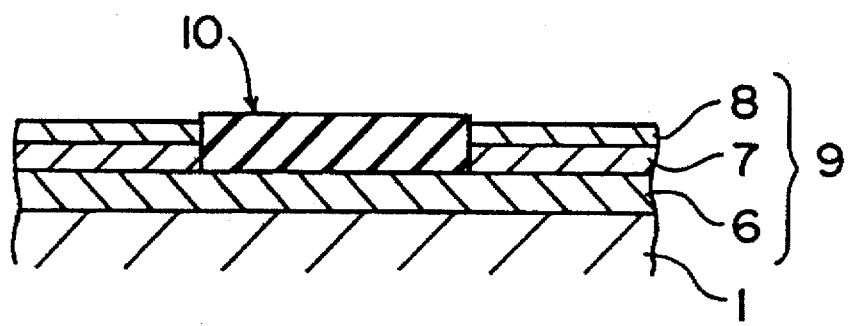
Figure 12:
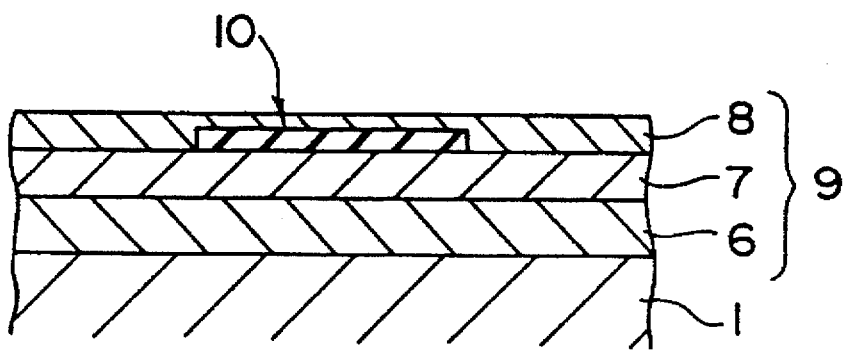
Figure 13:
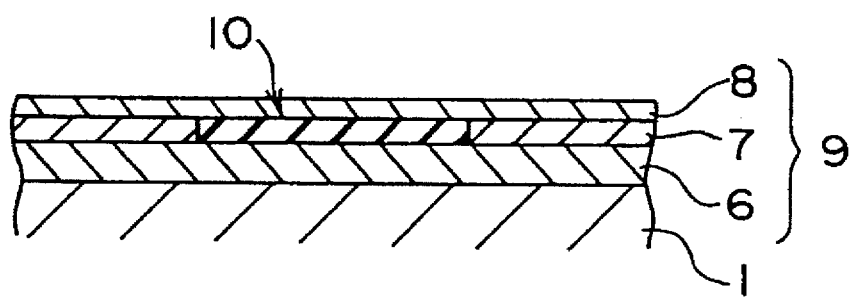
Figure 14:
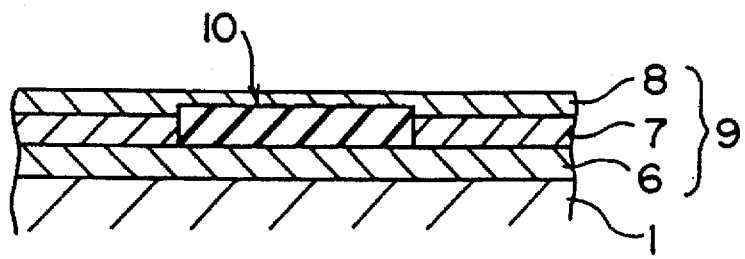
Figure 15:
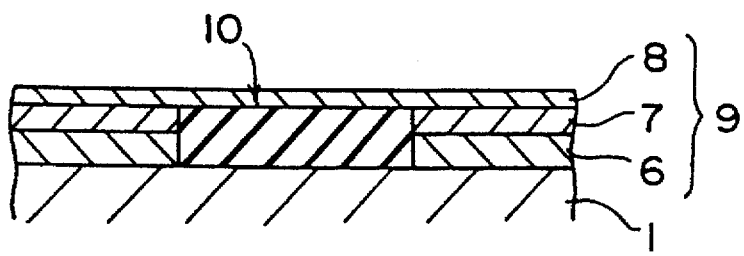

FIG. 6 is a perspective view of an embodiment of the optical card according to the present invention, and FIG. 7 a cross-sectional view of a portion including an optical recording layer.

As shown in FIG. 7, the optical card has the following construction. A pattern layer 2 and an optical recording layer 3 covering grooves of the pattern layer 2 are provided on the undersurface of a transparent protective layer 1. A card substrate 4 is laminated through an adhesive layer 5 so as to sandwich the optical recording layer 3 between the card substrate 4 and the pattern layer 2. A surface hard layer 9, having a three-layer structure, of a first layer 6, a second layer 7, and a third layer 8 is laminated on the transparent protective layer 1. As shown in FIG. 6, the magnetic stripe 10 is provided in a predetermined position which does not overlap with the optical recording layer 3 in a planar relationship. As shown in FIGS. 8 to 15, there are many embodiments on the form of provision of the magnetic stripe in the surface hard layer 9 or the transparent protective layer 1. The coercive force or the like is determined from the relationship with the R/W magnetism, and the magnetic stripe may be provided in such a form as will be compatible with the coercive force or the like.

The resin used for constituting the transparent protective layer 1 preferably has good optical properties. Specifically, the use of a resin having a light beam transmittance of not less than 90% (780 nm, 830 nm), an optical retardation of not more than 100 nm (single pass), or an optical elastic axis of not more than ±5% is preferred. The total thickness of the transparent protective layer and the hard layer 9 is preferably about 380 ±20 μm. Among conventional resins commonly used in the art, a polycarbonate resin (PC) is particularly preferred, and it is also possible to use an acrylic resin having the above optical properties. For example, when 2P is used for the formation of the pattern layer 2 on one side of the transparent protective layer, an extruded polycarbonate resin film, for example, Panlite Film manufactured by Teijin Ltd. or Lexan Film manufactured by GE, may be used. In this case, the interface between the layers 1 and 2 disappears by use of injection or casting method.

The pattern layer 2 provided on the undersurface of the transparent protective layer 1 may be generally formed by 2P, injection, casting, or other known methods. When the pattern layer 2 is formed by the 2P method, the resin used is a UV-curable resin. On the other hand, when the pattern layer 2 is formed by the injection or casting method, the resin used may be the same as that used in the transparent protective layer 1.

The optical recording layer 3 may be formed of a commonly used metallic optical recording material, such as a tellurium- or bismuth-based material. It may also be formed of a dye optical recording material, such as phthalocyanine- or naphthoquinone-based recording material. The optical recording layer may be of ROM type as well as write-once read-many type.

The card substrate 4 is formed of polyvinyl chloride, polyethylene terephthalate, acrylic styrene (AS), polycarbonate, ABS, polypropylene or the like. In the case of the card substrate formed of polyvinyl chloride, the layer construction may be of any of a three-layer type of 0.05/0.20/0.05 mm, 0.05/0.24/0.05 mm, 0.05/0.26/0.05 mm, 0.05/0.30/0.05 mm or the like, a two-layer type of 0.20/0.10 mm, 0.24/0.10 mm, 0.26/0.10 mm, 0.30/0.10 mm or the like, a single layer type of 0.30 mm, 0.34 mm, 0.36 mm, or 0.40 mm, and the like. 0.10 mm-thick polyvinyl chloride and 0.05 mm-thick polyvinyl chloride are transparent. On the other hand, polyvinyl chloride having a thickness of not less than 0.20 mm is pearlescent. In order to enhance the abrasion resistance of a print, it is preferred for the card substrate to have a two- or three-layer structure prepared by conducting printing on a pearlescent polyvinyl chloride and a transparent polyvinyl chloride is heat-sealed to the printed pearlescent polyvinyl chloride.

Known adhesives, such as urethane, epoxy, acrylic, vinyl, and amide adhesives, may be used as an adhesive for the adhesive layer 5. Since, however, the adhesive comes into direct contact with the optical recording layer 3, it preferably has high recording sensitivity and excellent temperature and moisture resistance. The thickness of the adhesive layer is preferably about 10 to 100 μm, and gravure coating, spin coating, knife coating, silk screen coating, Mayer bar coating, T-die coating or the like may be used to form the adhesive layer. The bonding is carried out by hot pressing using a flat press, a roll press or the like.

When the recording sensitivity of the optical recording layer 3 is unsatisfactory, a sensitizing layer may be provided between the optical recording layer 3 and the adhesive layer 5. The provision of the sensitizing layer is unnecessary when the recording sensitivity is satisfactory. The adhesive layer 5 is in contact with the optical recording layer 3. If the adhesive deteriorates the sensitivity of the optical recording layer 3, a transparent protective layer may be provided for avoiding this unfavorable phenomenon. When the sensitizing layer is provided, the transparent protective layer is provided between the sensitizing layer and the adhesive layer 5. However, the transparent protective layer may serve also as the sensitizing layer. When the adhesive layer is formed of a material which does not deteriorate the optical recording layer 3, there is no need to provide the transparent protective layer.

The first layer 6 in the hard layer 9 is formed in a thickness of not less than 20 μm using a radiation-curable resin, having a low shrinkage on curing, containing a functional monomer and/or a functional oligomer and, as an additive, at least one kind of an organic polymer type leveling agent or a combination of an organic polymer type leveling agent with a silicone on the transparent protective layer 1. For example, when a 20 μm-thick layer is formed using a radiation-curable resin having a shrinkage on curing of 12.3% on a 0.4 mm-thick PC sheet having a size of 200 mm×200 mm and put on a desk, the warpage of the PC sheet becomes 4.5 mm. When a sheet process is used, a warpage of not less than 4 mm leads to problems in subsequent steps. Further, when a card is prepared from the laminate, the warpage of the PC sheet is taken over by the card and the warpage of the card becomes 2.2 mm. Such a card does not meet standard requirements and further has deteriorated optical properties. On the other hand, when a 20 μm-thick layer is formed using a radiation-curable resin having a shrinkage on curing of 11.9% in the same manner as described above and put on a desk, the warpage of the PC sheet becomes 4.0 mm. When a card is prepared from the laminate, the warpage of the card becomes 1.8 mm. This card satisfies standard requirements. For this reason, a radiation-curable resin having a shrinkage on curing of not more than 12% is used in the present embodiment.

When the transparent protective layer 1 is formed of a polycarbonate resin, the functional monomer and/or functional oligomer are used in combination with N-vinylpyrrolidone as an agent for improving the adhesion to the polycarbonate and a reaction retardant, Irgacure 651, 184 or the like as an initiator a benzoin, acetophenone, thioxanthone, peroxide or other initiator) and the like, and an organic polymer type leveling agent or a combination of an organic polymer type leveling agent with at least either an internal curing type silicone or a silicone is added thereto to prepare a radiation-curable resin having a shrinkage on curing of not more than 12%. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In general, the use of a polyfunctional acrylate is likely to increase the hardness, resulting in increased shrinkage on curing. The shrinkage on curing should be not more than 12% in order to form the first layer 6 in a thickness of not less than 20 μm, i.e., a thickness large enough to avoid the influence of the underlying layer, and, at the same time, to provide a low warpage and to ensure satisfactory hardness. A thickness of about 20 to 30 μm is most preferred. When increasing the shrinkage on curing is contemplated, the thickness may be about 15 μm.

The second layer 7 is formed using a radiation-curable resin of which the hardness and the shrinkage on curing are between those of the above first layer 6 and those of the third layer 8 described below. More specifically, a functional monomer and a functional oligomer may be selected so as for the shrinkage on curing of the radiation-curable resin to be about 12 to 15%. An organic polymer type leveling agent or a combination of an organic polymer type leveling agent with at least either an internal curing type silicone or a silicone is added also to the radiation-curable resin for forming the second layer 7. A thickness of 1 to 10 μm is most preferred for the second layer 7.

The third layer 8 is formed, on the second layer 7, using a radiation-curable resin, having a relatively high shrinkage on curing, comprising a tri- to hexafunctional monomer as a main agent and a minor amount of a functional oligomer added to the main agent, because it should have hardness high enough to be used as a surface layer. An organic polymer type leveling agent, a conventional silicone, or a combination of an organic polymer type leveling agent with a conventional silicone may be added to the radiation-curable resin for forming the outermost layer. The leveling agent, when added in such a manner, serves to improve the adhesion to the second layer 7, reduce surface defects and, at the same time, increase the apparent hardness because the slip property is improved. If necessary, a photopolymerization initiation assistant (an amine, quinone or other assistant), a heat polymerization inhibitor, a filler (an inorganic or organic filler), a thixotropic agent, a plasticizer, an unreactive polymer, a colorant and the like may be added. In order to improve the bending strength, the proportion of the functional oligomer may be increased. In some cases, the resin used for constituting the second layer 7 may be incorporated in an amount of 0 to about 30%. Further, the shrinkage on curing of the radiation-curable resin used is regulated to not less than 15%. When the thickness of the third layer 8 is larger than 15 μm, the warpage of the optical card becomes large. Further, in this case, cracking occurs in a bending test, that is, the bending strength is unsatisfactory. On the other hand, when the thickness is smaller than 2 μm, the hardness is unsatisfactory. For this reason, the thickness is preferably 2 to 15 μm. However, a thickness of 2 to 5 μm is most preferred from the viewpoint of satisfying both the bending strength and hardness requirements.

An antistatic agent may be added to the first layer 6, the second layer 7, and the third layer 8 for antistatic purposes.

When the magnetic stripe is provided on the transparent protective layer 1 or a layer other than the outermost layer in the surface hard layer 9, the magnetic stripe 10 is protruded from the surface of the layer. Therefore, the method for forming a layer(s) to be provided thereon is determined by a contemplated final laminate form. In order that the magnetic stripe 10 and the surface hard layer 9 constitute an identical face or alternatively the magnetic stripe 10 is embedded, a 2P method using a specular PET or a slit reverse coating method wherein the resin is passed through a gap and enables an identical face to be formed is useful independently of irregularities on the underlying layer. If there is no need to form an identical face, the first layer 6, the second layer 7, and the third layer 8 may be formed by gravure coating, roll coating, Komma coating, spin coating, knife coating, silk screen coating, T-die coating, slide coating or the like. In this case, coating may be carried out after dilution with a solvent to a suitable extent. It should be noted that the first layer 6 and the second layer 7 may be formed by multicoat coating to have a multilayer structure.

When a conventional radiation-curable resin is coated by the above coating method, the leveling is unsatisfactory, resulting in many surface defects. The use of a silicone as a leveling agent is generally considered for preventing this unfavorable phenomenon. The addition of the conventional silicone to the first layer 6 and the second layer 7 causes the silicone to bleed on the surface of the layer, deteriorating the adhesion. As described above, according to the present invention, these problems are solved by adding an organic polymer type leveling agent or adding a combination of at least one kind of an organic polymer type leveling agent with a silicone. Regarding the third layer 8 as the outermost layer, as described above, the addition of an organic polymer type leveling agent or a conventional silicone or the addition of an organic polymer type leveling agent with a conventional silicone is preferred in order to avoid the occurrence of surface defects or to improve the slip property of the surface of the layer.

Although a hard layer 9 having a three-layer structure has been described in the present embodiment, the hard layer may have a two-, four-, or five-layer structure. In this case as well, the formation of layers for constituting the hard layer using radiation-curable resins in such a manner that the shrinkage on curing of the radiation-curable resins increases from the innermost layer toward the outermost layer enables the hardness of the cured surface to be increased while preventing the warpage of the card. Further, good bending strength can be ensured when the thickness of the layers constituting the hard layer is reduced from the innermost layer toward the outermost layer. The warpage of the card varies depending upon the shrinkage on curing and the thickness of the layers, and the relationship between the layer construction and the thickness of the magnetic stripe 10 should be taken into consideration. Therefore, the final layer construction may be determined using the shrinkage on curing, the thickness of the layers, and the thickness of the magnetic stripe as parameters so as to minimize the warpage.

Figure 16:
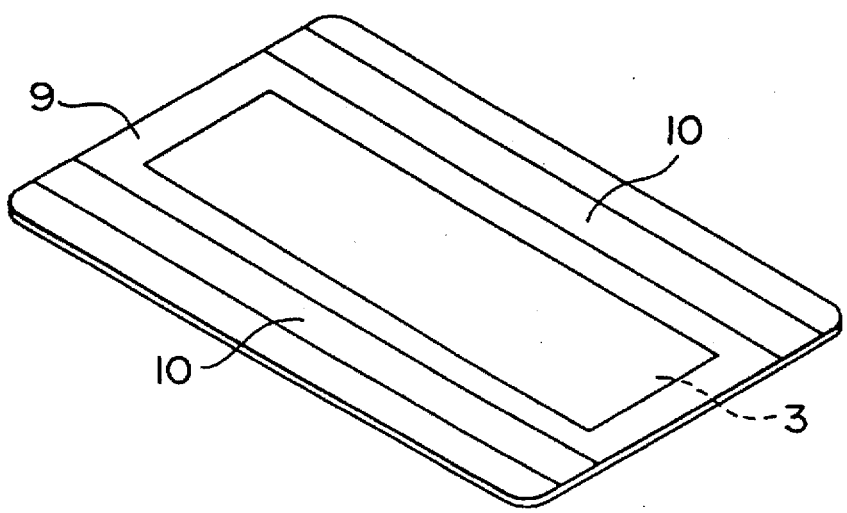
Figure 17:
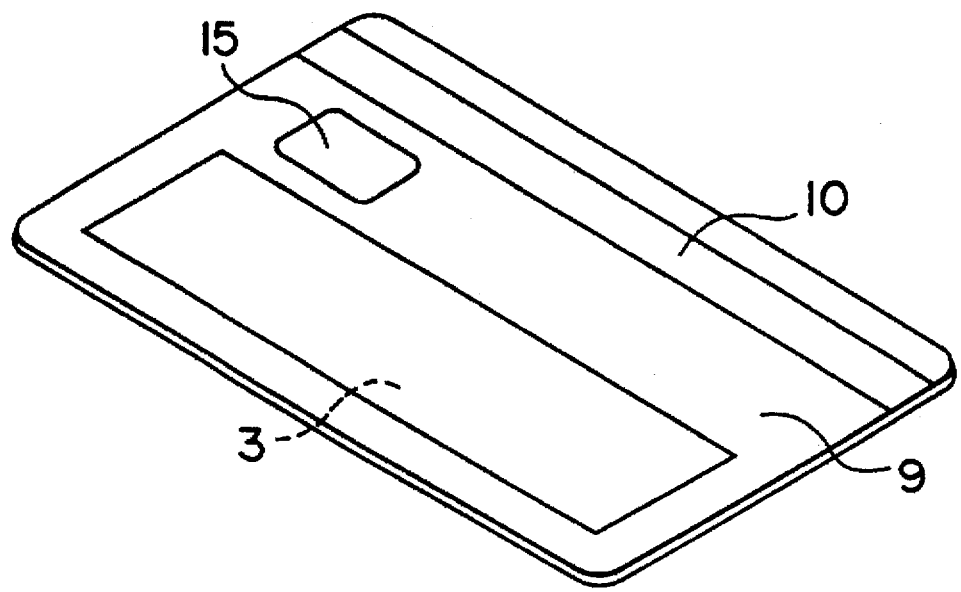
Figure 18:
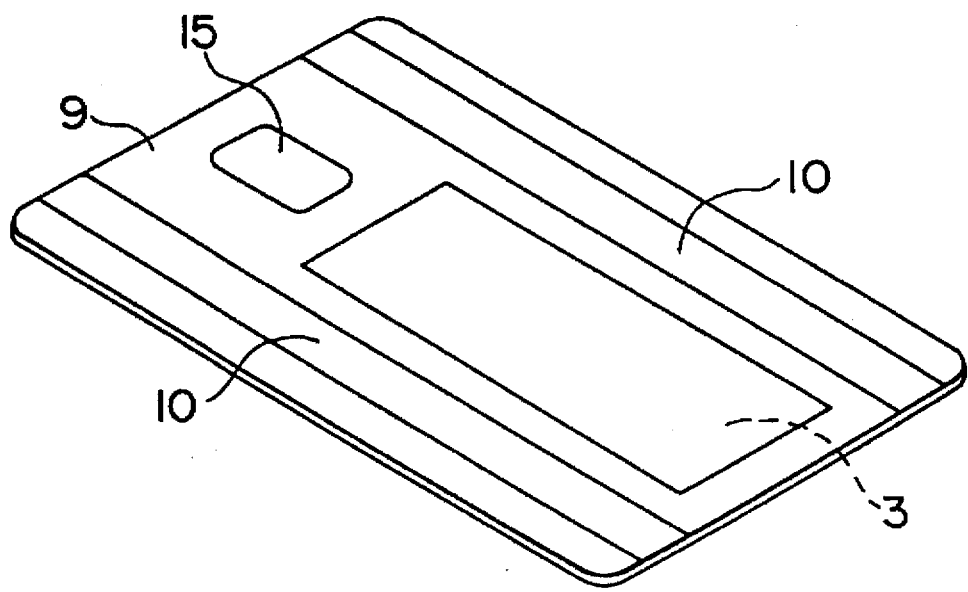

Further, in order to diversify the use of the card, a magnetic stripe 10 may be provided on the back side of the card substrate 4, and an IC chip may be provided on the same side as the optical recording face or on the opposite side of the optical recording face. It is also possible to provide at least one magnetic stripe 10 on the optical recording face and at least one magnetic stripe 10 on the back side of the card substrate 4. The maximum number of magnetic stripes 10, which can be provided in order to operate with a conventional ATM, is four. In this case, different information may be recorded for each magnetic stripe. These embodiments are shown in FIGS. 16 to 18. Specifically, FIG. 16, two magnetic stripes 10 are provided on the optical recording face; in FIG. 17, one magnetic stripe 10 and one IC chip 15 are provided; and in FIG. 18, two magnetic stripes 10 and one IC chip 15 are provided.

The present invention will now be described in more detail with reference to the following examples and comparative examples.

EXAMPLE A-1

A 0.4 mm-thick extruded polycarbonate having a size of 200 mm×200 mm was provided as a transparent protective layer, and a radiation-curable resin having the following composition was coated on one side of the transparent protective layer by means of a Mayer bar to a thickness of 30 μm, and the coating was then irradiated with ultraviolet (UV) light through a UV lamp (a microwave system, manufactured by Fusion) to cure the coating, thereby forming an intermediate layer. The shrinkage on UV curing of the radiation-curable resin was 9.6%, and the warpage was 2.5 mm at the time when the intermediate layer was formed on the transparent protective layer.

| | |
|---|---|
| Urethane acrylate oligomer (Gohselac UV7500B, manufactured by Nippon Synthetic Chemical Industry Co., Ltd.) | 100 parts |
| Hexamethylene diacrylate (Kayarad HDDA, manufactured by Nippon Kayaku Co., Ltd.) | 3 parts |
| Pentaerythritol triacrylate (Aronix M-305, manufactured by Toa Gosei Chemical Industry Co., Ltd.) | 3 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |

Then, a composition prepared by dispersing 0.5 part by weight of a reactive silicone (X-22-5002, manufactured by Shin-Etsu Silicone Co., Ltd.) in 100 parts by weight of a radiation-curable resin (UV-3700, manufactured by Toa Gosei Chemical Industry Co., Ltd.) was coated on the intermediate layer by means of a Mayer bar to a thickness of 5 μm, and the coating was irradiated with ultraviolet (UV) light through a UV lamp (a microwave system, manufactured by Fusion) to cure the coating, thereby forming a surface hard layer. At this point, the Taber abrasion was 9.8% in terms of the haze as measured under conditions of CS-10, 1 kg load and 100 revolutions, and the pencil hardness (according to JIS K-5400) was H.

Thereafter, a guide track pattern layer was formed by 2P method on the other side of the transparent protective layer remote from the intermediate layer and the surface hard layer. TeOx was sputtered thereon to form an optical recording material layer. Separately, silk offset printing was carried out on both sides of a 0.20 mm-thick core sheet of pearlescent polyvinyl chloride. This core sheet was then sandwiched between two 0.05 mm-thick overlay sheets, and heat fusing was carried out to prepare a card substrate having a three-layer structure. A magnetic tape of 650 oersted was previously formed on one side of the overlay sheet. The card substrate was bonded to the transparent protective layer with the aid of an adhesive (TU-4210, manufactured by Toray Industries, Inc.). After curing of the adhesive, a card (85.5× 54 mm) was punched from the laminate, thereby preparing an optical card.

The optical card thus obtained was used to write and read data of 100 tracks by optical card R/W (3B3H-DJ-01, manufactured by Omron Corp.). As a result, the error rate was satisfactorily low and not more than $1\times10^{-4}$. Further, the optical card had no problems associated with any of the bending strength, adhesion, transmission, and warpage properties and had good storage stability under service temperature and humidity conditions and thus was satisfactory for practical use as an optical card.

EXAMPLE A-2

The same extruded polycarbonate as used in Example 1 was provided as a transparent protective layer, and a radiation-curable resin having the following composition was coated on one side of the transparent protective layer by means of a Mayer bar to a thickness of 20 µm, and the coating was then irradiated with ultraviolet (UV) light through a UV lamp (a microwave system, manufactured by Fusion) to cure the coating, thereby forming an intermediate layer. The shrinkage on UV curing of the radiation-curable resin was 11.9%, and the warpage was 4.0 mm at the time when the intermediate layer was formed on the transparent protective layer.

| | |
|---|---|
| Urethane acrylate oligomer (Gohselac UV7500B, manufactured by Nippon Synthetic Chemical Industry Co., Ltd.) | 100 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Reactive silicone (X-22-5002, manufactured by Shin-Etsu Silicone Co., Ltd.) | 1 part |

A radiation-curable resin having the following composition was coated on the intermediate layer by means of a Mayer bar to a thickness of 5 µm, and the coating was irradiated with ultraviolet (UV) light through a UV lamp (a microwave system, manufactured by Fusion) to cure the coating, thereby forming a surface hard layer. At this point, the Taber abrasion was 9.0% in terms of the haze as measured under conditions of CS-10, 1 kg load and 100 revolutions, and the pencil hardness was H.

| | |
|---|---|
| Dipentaerythritol hexaacrylate (Kayarad DPHA, manufactured by Nippon Kayaku Co., Ltd.) | 10 parts |
| Pentaerythritol tetraacrylate (Aronix N-450, manufactured by Toa Gosei Chemical Industry Co., Ltd.) | 10 parts |
| Urethane acrylate oligomer (Gohselac UV7500B, manufactured by Nippon Synthetic Chemical Industry Co., Ltd.) | 3 parts |
| N-Vinylpyrrolidone (Aronix M-150, manufactured by Toa Gosei Chemical Industry Co., Ltd.) | 5 parts |
| 1-Hydroxycyclohexyl phenyl ketone (Irgacure 184, manufactured by Ciba-Geigy) | 0.5 part |
| Reactive silicone (X-22-5002, manufactured by Shin-Etsu Silicone Co., Ltd.) | 0.01 part |

Thereafter, the procedure of Example 1 was repeated to form a pattern layer and an optical recording material layer, and the laminate was laminated onto a card substrate, and a card was punched from the laminate, thereby preparing an optical card. The optical card thus obtained was used to write and read data of 100 tracks by optical card R/W (3B3H-DJ-01, manufactured by Omron Corp.). As a result, the error rate was satisfactorily low and not more than $1\times10^{-4}$. Further, the optical card had no problem associated with any of the bending strength, adhesion, transmission, and warpage and good storage stability under service temperature and humidity conditions and thus was satisfactory for practical use as an optical card.

COMPARATIVE EXAMPLE A-1

A 0.4 mm-thick extruded polycarbonate having a size of 200 mm×200 mm was provided as a transparent protective layer, and a radiation-curable resin having the following composition was coated on one side of the transparent protective layer by means of a Mayer bar to a thickness of 10 µm, and the coating was then irradiated with ultraviolet (UV) light through a UV lamp (a microwave system, manufactured by Fusion) to cure the coating, thereby forming a surface hard layer. The shrinkage on UV curing of the radiation-curable resin was 13.5%.

| | |
|---|---|
| Dipentaerythritol hexaacrylate (Kayarad DPHA, manufactured by Nippon Kayaku Co., Ltd.) | 10 parts |
| Pentaerythritol tetraacrylate (Aronix M-450, manufactured by Toa Gosei Chemical Industry Co., Ltd.) | 10 parts |
| Urethane acrylate oligomer (Gohselac UV7500B, manufactured by Nippon Synthetic Chemical Industry Co., Ltd.) | 2 parts |
| N-Vinylpyrrolidone (Aronix M-150, manufactured by Toa Gosei Chemical Industry Co., Ltd.) | 5 parts |
| 1-Hydroxycyclohexyl phenyl ketone (Irgacure 184, manufactured by Ciba-Geigy) | 0.5 part |

Thus, when the surface hard layer alone was formed in a thickness of 10 µm on the transparent protective layer, the pencil hardness was HB although the Taber abrasion was 9.5% in terms of the haze as measured under conditions of CS-10, 1 kg load and 100 revolutions. The warpage was 3.5 mm. From the above, it is apparent that unsatisfactory thickness results in unsatisfactory pencil hardness.

COMPARATIVE EXAMPLE A-2

The procedure of Comparative Example A-1 was repeated, except that the thickness of the surface hard layer was 25 μm. As a result, the Taber abrasion was 9.5% in terms of haze, and the pencil hardness was H. However, the warpage at this point was 4.8 mm, and a crack occurred in a bending test. Thus, when a radiation-curable resin having a large shrinkage was used, an increase in thickness resulted in increased warpage, deteriorating the bending strength.

As described above, according to the optical card of the present invention, a polycarbonate resin is used as a transparent protective layer, an intermediate layer, having a thickness of not less than 20 μm, formed of a radiation-cured resin having a shrinkage of not more than 12% is provided on the transparent protective layer, and a surface hard layer is provided on the intermediate layer. By virtue of this constitution, a polycarbonate, which is inexpensive and has good bending strength but has a low pencil hardness, may be used as a transparent protective layer, and an optical card, which is excellent also in scratch resistance, can be provided by utilizing the low warpage of the polycarbonate and by virtue of the synergistic effect of the intermediate layer and the surface hard layer.

EXAMPLE B-1

A 0.4 mm-thick extruded polycarbonate having a size of 200 mm×200 mm was provided as a transparent protective layer 1, and a radiation-curable resin having the following composition was coated on one side of the transparent protective layer by means of a Mayer bar to a thickness of 20 μm, and the coating was then irradiated with ultraviolet (UV) light through a UV lamp (a microwave system, manufactured by Fusion) to cure the coating, thereby forming a first layer 6. The shrinkage on UV curing of the radiation-curable resin was 9.6%, and the warpage was 2.5 mm at the time when the first layer 6 was formed on the transparent protective layer 1.

| | |
|---|---|
| Urethane acrylate oligomer (Gohselac UV7500B, manufactured by Nippon Synthetic Chemical Industry Co., Ltd.) | 100 parts |
| Hexamethylene diacrylate (Kayarad HDDA, manufactured by Nippon Kayaku Co., Ltd.) | 3 parts |
| Pentaerythritol triacrylate (Aronix M-305, manufactured by Toa Gosei Chemical Industry Co., Ltd.) | 3 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |

A radiation-curable resin having the following composition was coated on the first layer 6 by means of a Mayer bar to a thickness of 10 μm, and the coating was irradiated with ultraviolet (UV) light through a UV lamp (a microwave system, manufactured by Fusion) to cure the coating, thereby forming a second layer 7. The shrinkage on UV curing of the radiation-curable resin was 13.0%, and the warpage was 3.0 mm at the time when the second layer 7 was formed.

| | |
|---|---|
| Urethane acrylate oligomer (Gohselac UV7500B, manufactured by Nippon Synthetic Chemical Industry Co., Ltd.) | 80 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |

A composition prepared by dispersing 0.5 part by weight of a reactive silicone (X-22-5002, manufactured by Shin-Etsu Silicone Co., Ltd.) in 100 parts by weight of a radiation-curable resin (UV-3700, manufactured by Toa Gosei Chemical Industry Co., Ltd.) was coated on the second layer 7 by means of a Mayer bar to a thickness of 5 μm, and the coating was irradiated with ultraviolet (UV) light through a UV lamp (a microwave system, manufactured by Fusion) to cure the coating, thereby forming a third layer 8. The shrinkage on curing of the radiation-curable resin was 14.5%. At this point, the Taber abrasion was 9.8% in terms of the haze as measured under conditions of CS-10, 1 kg load and 100 revolutions, and the pencil hardness was H.

Thereafter, a guide track pattern layer 2 was formed by 2P on the other side of the transparent protective layer 1 remote from the hard layer 9 formed of the first layer 6, the second layer 7, and the third layer 8. TeOx was sputtered thereon to form an optical recording layer 3. Separately, silk offset printing was carried out on both sides of a 0.20 mm-thick core sheet of pearlescent polyvinyl chloride. This core sheet was then sandwiched between two 0.05 mm-thick overlay sheets, and heat fusing was carried out to prepare a card substrate 4 having a three-layer structure. A magnetic tape of 650 oersted was previously formed on one side of the overlay sheet. The card substrate 4 was bonded to the transparent protective layer 1 with the aid of an adhesive (TU-4210, manufactured by Toray Industries, Inc.). After curing of the adhesive, a card (85.5×54 mm) was punched from the laminate, thereby preparing an optical card.

The optical card thus obtained was used to write and read data of 100 tracks by optical card R/W (3B3H-DJ-01, manufactured by Omron Corp.). As a result, the error rate was satisfactorily low and not more than $1 \times 10^4$. Further, the optical card had no problem associated with any of the bending strength, adhesion, transmission, and warpage and good storage stability under service temperature and humidity conditions and thus was satisfactory for practical use as an optical card.

EXAMPLE B-2

The procedure of Example 1 was repeated, except that a third layer 8 in a hard layer 9 was formed as follows. Specifically, a composition prepared by dispersing 0.5 part by weight of a reactive silicone (X-22-5002, manufactured by Shin-Etsu Silicone Co., Ltd.) in 100 parts by weight of a radiation-curable resin (UV-3700, manufactured by Toa Gosei Chemical Industry Co., Ltd.) and further mixing 20 parts by weight of the resin used in the intermediate layer 7 with the dispersion was coated on the second layer 7 by means of a Mayer bar to a thickness of 5 μm, and the coating was irradiated with ultraviolet (UV) light through a UV lamp (a microwave system, manufactured by Fusion) to cure the coating, thereby forming a third layer 8. The shrinkage on curing of the radiation-curable resin was 14.0 %. At this point, the Taber abrasion was 15.8% in terms of the haze as measured under conditions of CS-10, 1 kg load and 100 revolutions, and the pencil hardness was H. Thereafter, an optical card was prepared in the same manner as in Example 1. The optical card thus obtained has better bending strength.

EXAMPLE B-3

The same extruded polycarbonate as used in Example 1 was provided as a transparent protective layer 1, and a radiation-curable resin having the following composition was coated on one side of the transparent protective layer by means of a Mayer bar to a thickness of 20 μm, and the coating was then irradiated with ultraviolet (UV) light through a UV lamp (a microwave system, manufactured by Fusion) to cure the coating, thereby forming a first layer 6. The shrinkage on UV curing of the radiation-curable resin was 11.9%, and the warpage was 4.0 mm at the time when the first layer 6 was formed on the transparent protective layer 1.

| | |
|---|---|
| Urethane acrylate oligomer (Gohselac UV7500B, manufactured by Nippon Synthetic Chemical Industry Co., Ltd.) | 100 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Reactive silicone (X-22-5002, manufactured by Shin-Etsu Silicone Co., Ltd.) | 1 part |

A radiation-curable resin having the following composition was coated on the first layer 6 by means of a Mayer bar to a thickness of 10 μm, and the coating was irradiated with ultraviolet (UV) light through a UV lamp (a microwave system, manufactured by Fusion) to cure the coating, thereby forming a first layer 6. The shrinkage on UV curing of the radiation-curable resin was 13.5%, and the warpage was 3.2 mm at the time when the second layer was formed.

| | |
|---|---|
| Urethane acrylate oligomer (Gohselac UV7500B, manufactured by Nippon Synthetic Chemical Industry Co., Ltd.) | 70 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Reactive silicone (X-22-5002, manufactured by Shin-Etsu Silicone Co., Ltd.) | 1 part |

A radiation-curable resin having the following composition was coated on the second layer 7 by means of a Mayer bar to a thickness of 5 μm, and the coating was irradiated with ultraviolet (UV) light through a UV lamp (a microwave system, manufactured by Fusion) to cure the coating, thereby forming a third layer 8. The shrinkage on curing was 14.3%. At this point, the Taber abrasion was 9.0% in terms of the haze as measured under conditions of CS-10, 1 kg load and 100 revolutions, and the pencil hardness was H.

| | |
|---|---|
| Dipentaerythritol hexaacrylate (Kayarad DPHA, manufactured by Nippon Kayaku Co., Ltd.) | 10 parts |
| Pentaerythritol tetraacrylate (Aronix M-450, manufactured by Toa Gosei Chemical Industry Co., Ltd.) | 10 parts |
| Urethane acrylate oligomer (Gohselac UV7500B, manufactured by Nippon Synthetic Chemical Industry Co., Ltd.) | 3 parts |
| N-Vinylpyrrolidone (Aronix M-150, manufactured by Toa Gosei Chemical Industry Co., Ltd.) | 5 parts |
| 1-Hydroxycyclohexyl phenyl ketone (Irgacure 184, manufactured by Ciba-Geigy) | 0.5 part |
| Silicon hexaacrylate (Ebecril-1360, manufactured by Daicel UCB Co.) | 0.01 part |

Thereafter, the procedure of Example 1 was repeated to form a pattern layer 2 and an optical recording layer 3, and the laminate was laminated onto a card substrate 4, and a card was punched from the laminate, thereby preparing an optical card. The optical card thus obtained was used to write and read data of 100 tracks by optical card R/W (3B3H-DJ-01, manufactured by Omron Corp.). As a result, the error rate was satisfactorily low and not more than $1 \times 10^{-4}$. Further, the optical card had no problem associated with any of the bending strength, adhesion, transmission, and warpage and good storage stability under service temperature and humidity conditions and thus was satisfactory for practical use as an optical card.

COMPARATIVE EXAMPLE B-1

A 0.4 mm-thick extruded polycarbonate having a size of 200 mm×200 mm was provided as a transparent protective layer, and a radiation-curable resin having the following composition was coated on one side of the transparent protective layer by means of a Mayer bar to a thickness of 10 μm, and the coating was then irradiated with ultraviolet (UV) light through a UV lamp (a microwave system, manufactured by Fusion) to cure the coating, thereby forming a surface hard layer. The shrinkage on UV curing of the radiation-curable resin was 14.1%.

| | |
|---|---|
| Dipentaerythritol hexaacrylate (Kayarad DPHA, manufactured by Nippon Kayaku Co., Ltd.) | 10 parts |
| Pentaerythritol tetraacrylate (Aronix M-450, manufactured by Toa Gosei Chemical Industry Co., Ltd.) | 10 parts |

| | |
|---|---|
| Urethane acrylate oligomer (Gohselac UV7500B, manufactured by Nippon Synthetic Chemical Industry Co., Ltd.) | 2 parts |
| N-Vinylpyrrolidone (Aronix M-150, manufactured by Toa Gosei Chemical Industry Co., Ltd.) | 5 parts |
| 1-Hydroxycyclohexyl phenyl ketone Irgacure 184, manufactured by Ciba-Geigy) | 0.5 part |

Thus, when the hard layer was formed in a thickness of 10 μm on the transparent protective layer, the Taber abrasion was 9.5% in terms of the haze as measured under conditions of CS-10, 1 kg load and 100 revolutions with the pencil hardness being HB. The warpage was 3.5 mm. From the above, it is apparent that unsatisfactory thickness results in unsatisfactory pencil hardness.

COMPARATIVE EXAMPLE B-2

The procedure of Comparative EXAMPLE B-1 was repeated, except that the thickness of the hard layer was 25 μm. As a result, the Taber abrasion was 9.5% in terms of haze, and the pencil hardness was H. However, the warpage at this point was 4.8 mm, and a crack occurred in a bending test. Thus, when a radiation-curable resin having a large shrinkage on curing was used, an increase in thickness resulted in increased warpage, deteriorating the bending strength.

As described above, according to the optical recording medium of the present invention, in an optical recording medium comprising at least a transparent protective layer and an optical recording layer laminated on top of the other, a multilayered hard layer comprised of layers formed by using radiation-curable resins in such a manner that the shrinkage on curing of the radiation-curable resins for forming the layers successively increases from the innermost layer toward the outermost layer is provided on the transparent protective layer, and, further, the thickness of the layers constituting the hard layer reduces from the innermost layer toward the outermost layer. By virtue of this constitution, the whole optical recording medium has low warpage, excellent bending strength, and excellent scratch resistance.

EXAMPLE C-1

An extruded polycarbonate having a thickness of 0.4 mm and a width of 400 mm was provided as a transparent protective layer. The following three radiation-curable resin compositions were diluted with IPA, and the resultant coating solutions were simultaneously coated by slide coating on one side of the transparent protective layer so that about 20 μm-thick, about 10 μm-thick, and about 5 μm-thick radiation-curable resin layers were put on top of one another. The resultant coatings were cured by irradiation with light through a high-pressure mercury lamp to form a first layer, a second layer, and a third layer. The shrinkages on curing of the radiation-curable resins used for the first, second, and third layers were respectively 9.6%, 13.0%, and 14.5%. The pencil hardnesses of the first, second, and third layers as measured on glass were respectively 2H, 4H, and 7H. The laminate as the final form had a pencil hardness of H and a Taber abrasion of 9.8% in terms of the haze as measured under conditions of CS-10, 1 kg load, and 100 revolutions.

| | |
|---|---|
| <First layer> | |
| Urethane acrylate oligomer (Gohselac UV7500B, manufactured by Nippon Synthetic Chemical Industry Co., Ltd.) | 100 parts |
| Hexamethylene diacrylate (Kayarad HDDA, manufactured by Nippon Kayaku Co., Ltd.) | 3 parts |
| Pentaerythritol triacrylate (Aronix M-305, manufactured by Toa Gosei Chemical Industry Co., Ltd.) | 3 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| <Second layer> | |
| Urethane acrylate oligomer (Gohselac UV7500B, manufactured by Nippon Synthetic Chemical Industry Co., Ltd.) | 80 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| <Third layer> | |
| Radiation-curable resin (UV-3700, manufactured by Toa Gosei Chemical Industry Co., Ltd.) | 100 parts |
| Reactive silicone (X-22-5002, manufactured by Shin-Etsu Silicone Co., Ltd.) | 0.5 part |

Thereafter, a guide track pattern layer was formed by 2P on the other side of the transparent protective layer remote from the hard layer formed of the first layer, the second layer, and the third layer. TeOx was sputtered thereon to form an optical recording layer. Separately, silk offset printing was carried out on both sides of a 0.20 mm-thick core sheet of pearlescent polyvinyl chloride. This core sheet was then sandwiched between two 0.05 mm-thick overlay sheets, and heat fusing was carried out to prepare a card substrate having a three-layer structure. A magnetic tape of 650 oersted was previously formed on one side of the overlay sheet. The card substrate was bonded to the transparent protective layer with the aid of an adhesive (TU-4210, manufactured by Toray Industries, Inc.). After curing of the adhesive, a card (85.5×54 mm) was punched from the laminate, thereby preparing an optical card.

The optical card thus obtained was used to write and read data of 100 tracks by optical card R/W (3B3H-DJ-01, manufactured by Omron Corp.). As a result, the error rate was satisfactorily low and not more than $1 \times 10^{-4}$. Further, the optical card had no problem associated with any of the bending strength, adhesion, transmission, and warpage and good storage stability under service temperature and humidity conditions and thus was satisfactory for practical use as an optical card.

EXAMPLE C-2

A hard layer was formed in the same manner as in Example C-1, except that only the composition of the third layer was varied. Specifically, a composition prepared by dispersing 0.5 part by weight of a reactive silicone (X-22-5002, manufactured by Shin-Etsu Silicone Co., Ltd.) in 100 parts by weight of a radiation-curable resin (UV-3700, manufactured by Toa Gosei Chemical Industry Co., Ltd.) and further mixing 20 parts by weight of the resin used in the second layer with the dispersion was used. The shrinkage on curing of this composition was 14.0%. At this point, the Taber abrasion was 10.5% in terms of the haze as measured under conditions of CS-10, 1 kg load and 100 revolutions, and the pencil hardness was H. Thereafter, an optical card was prepared in the same manner as in Example 1. The optical card thus obtained has better bending strength.

EXAMPLE C-3

The same extruded polycarbonate as used in Example C-1 was provided as a transparent protective layer. The following three radiation-curable resin compositions were diluted with toluene, and the resultant three coating solutions were simultaneously coated by slide coating on one side of the transparent protective layer so that about 25 µm-thick, about 12 µm-thick, and about 4 µm-thick radiation-curable resin layers were put on top of one another. The resultant coatings were cured by irradiation with light through a high-pressure mercury lamp to form a first layer, a second layer, and a third layer. The shrinkages on curing of the radiation-curable resins used for the first, second, and third layers were respectively 11.9%, 13.5%, and 14.3%. The pencil hardnesses of the first, second, and third layers as measured on glass were respectively 2H, 4H, and 7H. The laminate as the final form had a pencil hardness of H and a Taber abrasion of 9.0% in terms of the haze as measured under conditions of CS-10, 1 kg load, and 100 revolutions.

| <First layer> | |
|---|---|
| Urethane acrylate oligomer (Gohselac UV7500B, manufactured by Nippon Synthetic Chemical Industry Co., Ltd.) | 100 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Reactive silicone (X-22-5002, manufactured by Shin-Etsu Silicone Co., Ltd.) | 1 part |
| <Second layer> | |
| Urethane acrylate oligomer (Gohselac UV7500B, manufactured by Nippon Synthetic Chemical Industry Co., Ltd.) | 70 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Ceigy). | 10 parts |
| Reactive silicone (X-22-5002, manufactured by Shin-Etsu Silicone Co., Ltd.) | 1 part |
| <Third layer> | |
| Dipentaerythritol hexaacrylate (Kayarad DPHA, manufactured by Nippon Kayaku Co., Ltd.) | 10 parts |
| Pentaerythritol tetraacrylate (Aronix M-450, manufactured by Toa Gosei Chemical Industry Co., Ltd.) | 10 parts |
| Urethane acrylate oligomer (Gohselac UV7500B, manufactured by Nippon Synthetic Chemical Industry Co., Ltd.) | 3 parts |
| N-Vinylpyrrolidone (Aronix M-150, manufactured by Toa Gosei Chemical Industry Co., Ltd.) | 5 parts |
| 1-Hydroxycyclohexyl phenyl ketone (Irgacure 184, manufactured by Ciba-Geigy) | 0.5 part |
| Silicon hexaacrylate (Ebecril-1360, manufactured by Daicel UCB Co.) | |

Thereafter, the procedure of Example C-1 was repeated to form a pattern layer and an optical recording layer, and the laminate was laminated onto a card substrate, and a card was punched from the laminate, thereby preparing an optical card. The optical card thus obtained was used to write and read data of 100 tracks by optical card R/W (3B3H-DJ-01, manufactured by Omron Corp.). As a result, the error rate was satisfactorily low and not more than $1 \times 10^{-4}$. Further, the optical card had no problem associated with any of the bending strength, adhesion, transmission, and warpage and good storage stability under service temperature and humidity conditions and thus was satisfactory for practical use as an optical card.

COMPARATIVE EXAMPLE C-1

A 0.4 mm-thick extruded polycarbonate having a size of 200 mm×200 mm was provided as a transparent protective layer, and a radiation-curable resin having the following composition was coated on one side of the transparent protective layer by means of a Mayer bar to a thickness of 10 µm, and the coating was then irradiated with ultraviolet (UV) light through a UV lamp (a microwave system, manufactured by Fusion) to cure the coating, thereby forming a surface hard layer. The shrinkage on UV curing of the radiation-curable resin was 13.5%.

| | |
|---|---|
| Dipentaerythritol hexaacrylate (Kayarad DPHA, manufactured by Nippon Kayaku Co., Ltd.) | 10 parts |
| Pentaerythritol tetraacrylate (Aronix M-450, manufactured by Toa Gosei Chemical Industry Co., Ltd.) | 10 parts |
| Urethane acrylate oligomer (Gohselac UV7500B, manufactured by Nippon Synthetic Chemical Industry Co., Ltd.) | 2 parts |
| N-Vinylpyrrolidone (Aronix M-150, manufactured by Toa Gosei Chemical Industry Co., Ltd.) | 5 parts |
| 1-Hydroxycyclohexyl phenyl ketone Irgacure 184, manufactured by Ciba-Geigy) | 0.5 part |

Thus, when a 10 µm-thick hard layer was formed on the transparent protective layer, the pencil hardness was HB although the Taber abrasion was 9.5% in terms of the haze as measured under conditions of CS-10, 1 kg load and 100 revolutions. The warpage was 3.5 mm. From the above, it is apparent that unsatisfactory thickness results in unsatisfactory pencil hardness.

COMPARATIVE EXAMPLE C-2

The procedure of Comparative Example C-1 was repeated, except that the thickness of the surface hard layer was 25 µm. As a result, the Taber abrasion was 9.5% in terms of haze, and the pencil hardness was H. However, the warpage at this point was 4.8 mm, and a crack occurred in a bending test. Thus, when a radiation-curable resin having a large shrinkage on curing is used, an increase in thickness results in increased warpage, deteriorating the bending strength.

The present invention having the above constitution has the following effects.

The optical recording medium of the present invention has such a construction that the hardness of cured resin layers constituting a multilayered hard layer provided on a transparent protective layer continuously increases from the interface of the hard layer and the transparent protective layer toward the surface of the hard layer. In this construction, a layer having a higher hardness, i.e., a layer having a larger shrinkage on curing, is present on the external side with a layer having a lower hardness, i.e., a layer having a lower shrinkage on curing being present on the internal side, and no interface is present between these layers with the hardness being continuously changed, so that the whole laminate has lowered warpage, very good bending strength, and excellent scratch resistance.

Further, in the production of the optical recording medium, a plurality of curable resins different from each other or one another in shrinkage on curing are simultaneously fed so as to be put on top of the other or one another, and the resultant layers are collectively cured to form a hard layer on a transparent protective layer. Collective curing causes the resins constituting the layers to be delicately mixed together before curing, apparently eliminating the interface of the layers. Further, since the hardness increases from the interface of the hard layer and the transparent protective layer toward the surface of the hard layer, the optical recording layer has very good bending strength and, at the same time, excellent scratch resistance and warping resistance.

EXAMPLE D-1

A 0.4 mm-thick extruded polycarbonate having a size of 200 mm×200 mm was provided as a transparent protective layer 1, and a radiation-curable resin having the following composition A was coated on one side of the transparent protective layer by means of a Mayer bar to a thickness of 20 µm, and the coating was then irradiated with ultraviolet (UV) light through a UV lamp (a microwave system, manufactured by Fusion) to cure the coating, thereby forming a first layer 6. The shrinkage on UV curing of the radiation-curable resin was 9.6%, and the warpage was 2.5 mm at the time when the first layer 6 was formed on the transparent protective layer 1.

| <Composition A> | |
| --- | --- |
| Urethane acrylate oligomer (Gohselac UV7500B, manufactured by Nippon Synthetic Chemical Industry Co., Ltd.) | 100 parts |
| Hexamethylene diacrylate (Kayarad HDDA, manufactured by Nippon Kayaku Co., Ltd.) | 3 parts |
| Pentaerythritol triacrylate (Aronix M-305, manufactured by Toa Gosei Chemical Industry Co., Ltd.) | 3 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Reactive silicone (X-22-5002, manufactured by Shin-Etsu Silicone Co., Ltd.) | 0.2 part |

A radiation-curable resin having the following composition B was coated on the first layer 6 by means of a Mayer bar to a thickness of 10 µm, and the coating was irradiated with ultraviolet (UV) light through a UV lamp (a microwave system, manufactured by Fusion) to cure the coating, thereby forming a second layer 7. The shrinkage on UV curing of the radiation-curable resin was 13.0%, and the warpage was 3.0 mm at the time when the second layer was formed.

| Composition B> | |
| --- | --- |
| Urethane acrylate oligomer (Gohselac UV7500B, manufactured by Nippon Synthetic Chemical Industry Co., Ltd.) | 80 parts |
| Pentaerythritol triacrylate (Aronix M-305, manufactured by Toa Gosei Chemical Industry Co., Ltd. ) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Reactive silicone (X-22-5002, manufactured by Shin-Etsu Silicone Co., Ltd.) | 0.2 part |

Then, a composition prepared by dispersing 0.5 part by weight of a silicon hexaacrylate (Ebecril-1360, manufactured by Daicel UCB Co.) in 100 parts by weight of a radiation-curable resin (UV-370, manufactured by Toa Gosei Chemical Industry Co., Ltd. ) was coated on the second layer 7 by means of a Mayer bar to a thickness of 5 µm, and the coating was irradiated with ultraviolet (UV) light through a UV lamp (a microwave system, manufactured by Fusion) to cure the coating, thereby forming a third layer 8. The shrinkage on curing of the radiation-curable resin was 14.5%. At this point, the Taber abrasion was 9.8% in terms of the haze as measured under conditions of CS-10, 1 kg load and 100 revolutions, and the pencil hardness was H.

Thereafter, a guide track pattern layer 2 was formed by 2P on the other side of the transparent protective layer 1 remote from the hard layer 9 formed of the first layer 6, the second layer 7, and the third layer 8. TeOx was sputtered thereon to form an optical recording layer 3. Separately, silk offset printing was carried out on both sides of a 0.20 mm-thick core sheet of pearlescent polyvinyl chloride. This core sheet was then sandwiched between two 0.05 mm-thick overlay sheets, and heat fusing was carried out to prepare a card substrate 4 having a three-layer structure. A magnetic tape of 650 oersted was previously formed on one side of the overlay sheet. The card substrate 4 was bonded to the transparent protective layer 1 with the aid of an adhesive (TU-4210, manufactured by Toray Industries, Inc.). After curing of the adhesive, a card (85.5×54 mm) was punched from the laminate, thereby preparing an optical card.

The optical card thus obtained was used to write and read data of 100 tracks by optical card R/W (3B3H-DJ-01, manufactured by Omron Corp.). As a result, the error rate was satisfactorily low and not more than $1 \times 10^{-4}$. Further, the optical card had no problem associated with any of the bending strength, adhesion, transmission, and warpage and good storage stability under service temperature and humidity conditions and thus was satisfactory for practical use as an optical card.

EXAMPLE D-2

The procedure of Example D-1 was repeated, except that a third layer 8 in a hard layer 9 was formed as follows. Specifically, a composition prepared by dispersing 0.5 part by weight of a silicon hexaacrylate (Ebecril-1360, manufactured by Daicel UCB Co. ) in 100 parts by weight of a radiation-curable resin (UV-3700, manufactured by Toa Gosei Chemical Industry Co., Ltd.) and further mixing 20 parts by weight of the resin used in the second layer 7 with the dispersion was coated on the second layer 7 by means of a Mayer bar to a thickness of 5 μm, and the coating was irradiated with ultraviolet (UV) light through a UV lamp (a microwave system, manufactured by Fusion) to cure the coating, thereby forming a third layer 8. The shrinkage on curing of the radiation-curable resin was 14.0%. At this point, the Taber abrasion was 10.5% in terms of the haze as measured under conditions of CS-10, 1 kg load and 100 revolutions, and the pencil hardness was H. Thereafter, an optical card was prepared in the same manner as in Example D-1. The optical card thus obtained has better bending strength.

EXAMPLE D-3

The same extruded polycarbonate as used in Example D-1 was provided as a transparent protective layer 1, and a radiation-curable resin having the following composition C was coated on one side of the transparent protective layer by means of a Mayer bar to a thickness of 20 μm, and the coating was then irradiated with ultraviolet (UV) light through a UV lamp (a microwave system, manufactured by Fusion) to cure the coating, thereby forming a first layer 6. The shrinkage on UV curing of the radiation-curable resin was 11.9%, and the warpage was 4.0 mm at the time when the first layer 6 was formed on the transparent protective layer 1.

<Composition C>

| | |
|---|---|
| Urethane acrylate oligomer (Gohselac UV7500B, manufactured by Nippon Synthetic Chemical Industry Co., Ltd.) | 100 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Silicone/acrylic copolymer resin (Chaline R-134, manufactured by Nissin Chemical Industry Co., Ltd.) | 0.2 part |

A radiation-curable resin having the following composition D was coated on the first layer 6 by means of a Mayer bar to a thickness of 10 μm, and the coating was irradiated with ultraviolet (UV) light through a UV lamp (a microwave system, manufactured by Fusion) to cure the coating, thereby forming a second layer 7. The shrinkage on UV curing of the radiation-curable resin was 13.5%, and the warpage was 3.2 mm at the time when the second layer 7 was formed.

<Composition D>

| | |
|---|---|
| Urethane acrylate oligomer (Gohselac UV7500B, manufactured by Nippon Synthetic Chemical Industry Co., Ltd. ) | 70 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Silicone/acrylic copolmner resin (Chaline R-134, manufactured by Nissin Chemical Industry Co., Ltd.) | 0.2 part |

A radiation-curable resin having the following composition E was coated on the second layer 7 by means of a Mayer bar to a thickness of 5 μm, and the coating was irradiated with ultraviolet (UV) light through a UV lamp (a microwave system, manufactured by Fusion) to cure the coating, thereby forming a third layer 8. The shrinkage on coating was 14.3%. At this point, the Taber abrasion was 9.0% in terms of the haze as measured under conditions of CS-10, 1 kg load and 100 revolutions, and the pencil hardness was H.

| <Composition E> | |
|---|---|
| Dipentaerythritol hexaacrylate (Kayarad DPHA, manufactured by Nippon Kayaku Co., Ltd.) | 10 parts |
| Pentaerythritol tetraacrylate (Aronix M-450, manufactured by Toa Gosei Chemical Industry Co., Ltd.) | 10 parts |
| Urethane acrylate oligomer (Gohselac UV7500B, manufactured by Nippon Synthetic Chemical Industry Co., Ltd.) | 3 parts |
| N-Vinylpyrrolidone (Aronix M-150, manufactured by Toa Gosei Chemical Industry Co., Ltd.) | 5 parts |
| 1-Hydroxycyclohexyl phenyl ketone (Irgacure 184, manufactured by Ciba-Geigy) | 0.5 parts |
| Silicon hexaacrylate (Ebecril-1360, manufactured by Daicel UCB Co.) | 0.01 part |

Thereafter, the procedure of Example D-1 was repeated to form a pattern layer 2 and an optical recording layer 3, and the laminate was laminated onto a card substrate 4, and a card was punched from the laminate, thereby preparing an optical card. The optical card thus obtained was used to write and read data of 100 tracks by optical card R/W (3B3H-DJ-01, manufactured by Omron Corp.). As a result, the error rate was satisfactorily low and not more than $1 \times 10^{-4}$. Further, the optical card had no problem associated with any of the bending strength, adhesion, transmission, and warpage and good storage stability under service temperature and humidity conditions and thus was satisfactory for practical use as an optical card.

As described above, according to the optical recording medium of the present invention, in an optical recording medium comprising at least a transparent protective layer and an optical recording layer laminated on top of the other, a multilayered hard layer comprised of layers formed by using radiation-curable resins in such a manner that the shrinkage on curing of the radiation-curable resins for forming the layers increases from the innermost layer toward the outermost layer is provided on the transparent protective layer, and at least one kind of an organic polymer leveling agent or a combination of an organic polymer type leveling agent with a silicone is added to all the layers constituting the hard layer except for the outermost layer. By virtue of the above constitution, the optical recording medium has good adhesion between the layers, no significant surface defect, no significant warpage, and excellent bending strength and scratch resistance. Regarding the outermost layer, the addition of an organic polymer leveling agent or a silicone or the addition of an organic polymer leveling agent in combination with a silicone results in improved slip property and resistance to soils.

EXAMPLE E-1

A 0.4 mm-thick extruded polycarbonate having a size of 200 mm×200 mm was provided as a transparent protective layer, and a radiation-curable resin having the following composition A was coated on one side of the transparent protective layer by means of a Mayer bar to a thickness of 20 μm, and the coating was then irradiated with ultraviolet (UV) light through a UV lamp (a microwave system, manufactured by Fusion) to cure the coating, thereby forming a first layer. The shrinkage on UV curing of the radiation-curable resin was 9.6%, and the warpage was 2.5 mm at the time when the first layer was formed on the transparent protective layer.

| <Composition A> | |
|---|---|
| Urethane acrylate oligomer (Gohselac UV7500B, manufactured by Nippon Synthetic Chemical Industry Co., Ltd.) | 100 parts |
| Hexamethylene diacrylate (Kayarad HDDA, manufactured by Nippon Kayaku Co., Ltd.) | 3 parts |
| Pentaerythritol triacrylate (Aronix M-305, manufactured by Toa Gosei Chemical Industry Co., Ltd.) | 3 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Reactive silicone (X-22-5002, manufactured by Shin-Etsu Silicone Co., Ltd.) | 0.2 part |

A previously formed magnetic stripe (width 6.5 mm, thickness 15 μm) of 650 oersted was thermally transferred onto the first layer. Subsequently, a radiation-curable resin having the following composition B was suitably diluted with a solvent, and the resultant coating solution was coated by means of a spinner on the first layer to a thickness of 10 μm so as to cover the magnetic stripe. The coating was irradiated with light through a UV lamp (a microwave system, manufactured by Fusion) to cure the coating, thereby forming the second layer. The shrinkage on UV curing of the radiation-curable resin was 13.0%, and the warpage was 2.8 mm at the time when the second layer was formed.

| <Composition B> | |
|---|---|
| Urethane acrylate oligomer (Gohselac UV7500B, manufactured by Nippon Synthetic Chemical Industry Co., Ltd.) | 80 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Reactive silicone (X-22-5002, manufactured by Shin-Etsu Silicone Co., Ltd.) | 0.2 part |

Then, a composition prepared by dispersing 0.5 part by weight of a silicon hexaacrylate (Ebecril-1360, manufactured by Daicel UCB Co.) in 100 parts by weight of a radiation-curable resin (UV-3700, manufactured by Toa Gosei Chemical industry Co., Ltd.) was coated on the second layer by means of a Mayer bar to a thickness of 6 μm, and the coating was irradiated with UV through a UV lamp (a microwave system, manufactured by Fusion) to cure the coating, thereby forming a third layer. The shrinkage on curing of the radiation-curable resin was 14.5%. At this point, the Taber abrasion was 9.8% in terms of the haze as measured under conditions of CS-10, 1 kg load and 100 revolutions, and the pencil hardness was H.

Thereafter, a guide track pattern layer was formed by 2P on the other side of the transparent protective layer 1 remote from the surface hard layer formed of the first layer, the second layer, and the third layer. TeOx was sputtered thereon to form an optical recording layer. Separately, silk offset printing was carried out on both sides of a 0.20 mm-thick core sheet of pearlescent polyvinyl chloride. This core sheet was then sandwiched between two 0.05 mm-thick overlay sheets, and heat fusing was carried out to prepare a card substrate having a three-layer structure. A magnetic tape of 300 oersted was previously formed on one side of the overlay sheet. The card substrate was bonded to the transparent protective layer with the aid of an adhesive (TU-4210, manufactured by Toray Industries, Inc.). After curing of the adhesive, a card (85.5×54 mm) was punched from the laminate, thereby preparing an optical card.

The optical card thus obtained was used to write and read data of 100 tracks by optical card R/W (3B3H-DJ-01, manufactured by Omron Corp.). As a result, the error rate was satisfactorily low and not more than $1 \times 10^{-4}$. Further, the optical card had no problem associated with any of the bending strength, adhesion, transmission, and warpage and good storage stability under service temperature and humidity conditions and thus was satisfactory for practical use as an optical card.

EXAMPLE E-2

The procedure of Example E-1 was repeated, except that a third layer in a surface hard layer was formed as follows. Specifically, a composition prepared by dispersing 0.5 part by weight of a silicon hexaacrylate (Ebecril-1360, manufactured by Daicel UCB Co.) in 100 parts by weight of a radiation-curable resin (UV-3700, manufactured by Toa Gosei Chemical Industry Co., Ltd.) and further mixing 20 parts by weight of the resin used in the second layer with the dispersion was coated on the second layer by means of a Mayer bar to a thickness of 3 μm, and the coating was irradiated with ultraviolet (UV) light through a UV lamp (a microwave system, manufactured by Fusion) to cure the coating, thereby forming a third layer. The shrinkage on curing of the radiation-curable resin was 14.0%. At this point, the Taber abrasion was 10.5% in terms of the haze as measured under conditions of CS-10, 1 kg load and 100 revolutions, and the pencil hardness was H. Thereafter, an optical card was prepared in the same manner as in Example E-1. The optical card thus obtained has better bending strength.

EXAMPLE E-3

The same extruded polycarbonate as used in Example E-1 was provided as a transparent protective layer, and a radiation-curable resin having the following composition C was coated on one side of the transparent protective layer by means of a Mayer bar to a thickness of 25 μm, and the coating was then irradiated with ultraviolet (UV) light through a UV lamp (a microwave system, manufactured by Fusion) to cure the coating, thereby forming a first layer. The shrinkage on UV curing of the radiation-curable resin was 11.9%, and the warpage was 2.6 mm at the time when the first layer was formed on the transparent protective layer.

| <Composition C> | |
|---|---|
| Urethane acrylate oligomer (Gohselac UV7500B, manufactured by Nippon Synthetic Chemical Industry Co., Ltd.) | 100 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Silicone/acrylic copolymer resin (Chaline R-134, manufactured by Nissin Chemical Industry Co., Ltd.) | 0.2 part |

A previously formed magnetic stripe (width 6.5 mm, thickness 15 μm) of 650 oersted was thermally transferred onto the first layer. Subsequently, a radiation-curable resin having the following composition D was coated by 2P using a specular PET to a thickness of 15 μm on the first layer so as to cover the magnetic stripe, and the coating was irradiated with UV through a UV lamp (a microwave system, manufactured by Fusion) to cure the coating, thereby forming a second layer. The shrinkage on UV curing of the radiation-curable resin was 13.5%, and the warpage was 3.1 mm at the time when the second layer 7 was formed.

| <Composition D> | |
|---|---|
| Urethane acrylate oligomer (Gohselac UV7500B, manufactured by Nippon Synthetic Chemical Industry Co., Ltd.) | 70 parts |
| Pentaerythritol triacrylate (Aronix M-305, manufactured by Toa Gosei Chemical Industry Co., Ltd.) | 10 parts |
| Pentaerythritol tetraacrylate (Aronix M-450, manufactured by Toa Gosei Chemical Industry Co., Ltd.) | 10 parts |
| Dipentaerythritol hexaacrylate (Kayarad DPHA, manufactured by Nippon Kayaku Co., Ltd.) | 3 parts |
| N-Vinylpyrrolidone (Aronix M-150, manufactured by Toa Gosei Chemical Industry Co., Ltd.) | 50 parts |
| 1-Hydroxycyclohexyl phenyl ketone (Irgacure 184, manufactured by Ciba-Geigy) | 10 parts |
| Organic copolymer (Polyflow No. 90, manufactured by Kyoeisha Chemical Co., Ltd.) | 0.8 part |
| Silicone/acrylic copolymer resin (Chaline R-134, manufactured by Nissin Chemical Industry Co., Ltd.) | 0.2 part |

A radiation-curable resin having the following composition E was coated on the second layer by means of a Mayer bar to a thickness of 3 μm, and the coating was irradiated with ultraviolet (UV) light through a UV lamp (a microwave system, manufactured by Fusion) to cure the coating, thereby forming a third layer. The shrinkage on curing was 14.3%. At this point, the Taber abrasion was 9.8% in term of the haze as measured under condition of CS-10, 1 kg load and 100 revolutions, and the pencil hardness was H.

| <Composition E> | |
|---|---|
| Dipentaerythritol hexaacrylate (Kayarad DPHA, manufactured by Nippon Kayaku Co., Ltd.) | 10 parts |
| Pentaerythritol tetraacrylate (Aronix M-450, manufactured by Toa Gosei Chemical Industry Co., Ltd.) | 10 parts |
| Urethane acrylate oligomer (Gohselac UV7500B, manufactured by Nippon Synthetic Chemical Industry Co., Ltd.) | 3 parts |
| N-Vinylpyrrolidone (Aronix M-150, manufactured by Toa Gosei Chemical Industry Co., Ltd.) | 5 parts |
| 1-Hydroxycyclohexyl phenyl ketone (Irgacure 184, manufactured by Ciba-Geigy) | 0.5 parts |
| Silicon hexaacrylate (Ebecril-1360, manufactured by Daicel UCB Co.) | 0.01 part |

Thereafter, the procedure of Example E-1 was repeated to form a pattern layer and an optical recording layer, and the laminate was laminated onto a card substrate, and a card was punched from the laminate, thereby preparing an optical card. The optical card thus obtained was used to write and read data of 100 tracks by optical card R/W (3B3H-DJ-01, manufactured by Omron Corp.). As a result, the error rate was satisfactorily low and not more than $1 \times 10^{-4}$. Further, the optical card had no problem associated with any of the bending strength, adhesion, transmission, and warpage and possesses good storage stability under service temperature and humidity conditions and thus was satisfactory for practical use as an optical card.

As described above, according to the present invention, in an optical card comprising a card substrate and, laminated on the card substrate, an optical recording member comprising a laminate of at least a transparent protective layer and an optical recording layer, a multilayered surface hard layer formed of a radiation-cured resin is formed on the transparent protective layer, and a magnetic stripe is provided on the surface hard layer. By virtue of the above constitution, the formation of the outermost layer of the surface hard layer after the provision of a magnetic stripe on a layer(s) other than the outermost layer of the surface hard layer or on the transparent protective layer enables the magnetic stripe to be embedded so as for the outermost layer of the surface hard layer and the magnetic stripe together to constitute an identical face or so as not to be exposed from the surface hard layer, thus making it possible to provide an optical card, provided with a magnetic stripe, having a good appearance.

Further, the addition of at least an organic polymer type leveling agent to all the layers in the surface hard layer except for the outermost layer and the formation of the multilayered surface hard layer using radiation-curable resins in such a manner that the shrinkage on curing of the radiation-curable resin successively increases from the innermost layer toward the outermost layer make it possible to provide an optical card, provided with a magnetic stripe, having good adhesion between the layers, no significant defect, no significant warpage, and excellent bending strength and scratch resistance.

We claim:

1. An optical recording medium, comprising:
   a card substrate;
   an optical recording member, laminated on the card substrate, comprising a laminate of at least a transparent protective layer and an optical recording material layer, the transparent protective layer comprising a polycarbonate resin;
   an intermediate layer comprising a radiation-cured resin, provided on the transparent protective layer, having a thickness of not less than 20 µm and having a shrinkage of not more than 12%; and
   a surface hard layer provided on the intermediate layer, the surface hard layer being a radiation-cured resin multilayered hard layer wherein the curing shrinkage successively increases from the innermost layer toward the outermost layer.

2. The optical recording medium according to claim 1, wherein the surface hard layer has a thickness of 2 to 15 µm, comprises a radiation-cured resin containing a leveling agent, and has a higher hardness than the intermediate layer.

3. The optical recording medium according to claim 1, wherein at least one of the intermediate layer and the surface hard layer comprises an antistatic agent.

4. The optical recording medium according to claim 1, further comprising one of an IC module and a magnetic stripe provided on a part of the card substrate.

5. The optical recording medium according to claim 1, wherein the intermediate layer has a multilayer structure.

6. The optical recording medium according to claim 1, wherein the surface hard layer comprises a radiation-cured resin containing a leveling agent.

7. The optical recording medium according to claim 1, wherein the hardness of the surface hard layer is higher than that of the intermediate layer.

8. An optical recording medium, comprising:
   a laminate of at least a transparent protective layer and an optical recording layer; and
   a multilayered hard layer, provided on the transparent protective layer,
   wherein layers constituting the multilayered hard layer comprise radiation-curable resins formed such that the curing shrinkage successively increases from the innermost layer toward the outermost layer, and the thickness of the layers are successively reduced from the innermost layer toward the outermost layer.

9. The optical recording medium according to claim 8 wherein the outermost layer of the multilayered hard layer comprises a leveling agent.

10. The optical recording medium according to claim 8, wherein all the layers constituting the multilayered hard layer except for the outermost layer comprise a reactive leveling agent.

11. The optical recording medium according to claim 8, wherein each layer constituting the multilayered hard layer comprises an antistatic agent.

12. An optical recording medium comprising a laminate of at least a transparent protective layer and an optical recording layer, the transparent protective layer bearing a hard layer comprising a cured resin,
   the hardness and the shrinkage of the hard layer increasing continuously from the interface of the hard layer and the transparent protective layer toward the outer surface of the hard layer.

13. The optical recording medium according to claim 12, wherein the hard layer includes a leveling agent.

14. The optical recording medium according to claim 12, wherein the hard layer includes an antistatic agent.

15. A process for producing an optical recording medium comprising a laminate of at least a transparent protective layer and an optical recording layer, the transparent protective layer bearing a hard layer comprising a cured resin, said process comprising the steps of:

simultaneously feeding a plurality of curable resins each having different curing shrinkages onto a transparent protective layer; and curing the curable resins whereby curing shrinkage of each curable resin increases from the interface of the curable resin and the transparent protective layer toward the outer surface of the resultant laminate, thereby forming a hard layer from a laminate of a plurality of layers having different curing shrinkages.

16. The process according to claim 15, wherein the curable resin includes a leveling agent.

17. The process according to claim 15, wherein the curable resin includes an antistatic agent.

18. An optical recording medium, comprising:

a laminate of at least a transparent protective layer and an optical recoding layer;

a multilayered hard layer, provided on the transparent protective layer, comprising a plurality of layers of radiation-curable resins arranged such that the curing shrinkage successively increases from the innermost layer toward the outermost layer, wherein all the layers constituting the hard layer, except for the innermost layer, comprise an organic polymeric leveling agent.

19. The optical recording medium according to claim 18, wherein the outermost layer in the hard layer includes an organic polymeric type leveling agent.

20. The optical recording medium according to claim 18, wherein the outermost layer in the hard layer includes a silicone.

21. The optical recording medium according to claim 18, wherein the outermost layer in the hard layer includes an organic polymeric leveling agent and a silicone.

22. An optical recording medium comprising at least a transparent protective layer and an optical recording layer, the transparent protective layer bearing a multilayered hard layer, wherein all layers constituting the hard layer comprise radiation-curable resins and are arranged such that the curing shrinkage successively increases from the innermost layer toward the outermost layer, and all the layers constituting the hard layer, except for the outermost layer, include an organic polymeric leveling agent and a silicone.

23. The optical recording medium according to claim 22, wherein the outermost layer in the hard layer includes an organic polymeric leveling agent.

24. The optical recording medium according to claim 22, wherein the outermost layer in the hard layer includes a silicone.

25. The optical recording medium according to claim 22, wherein the outermost layer in the hard layer includes an organic polymeric leveling agent and a silicone.

26. An optical recording medium, comprising:

a card substrate;

an optical recording member, laminated on the card substrate, comprising a laminate of at least a transparent protective layer and an optical recording layer; and a magnetic stripe provided on the transparent protective layer side of the optical recording member.

27. The optical recording medium according to claim 26, wherein the transparent protective layer bears a multilayered surface hard layer, layers constituting the hard layer comprise a radiation-cured resin and, the magnetic stripe is provided on the surface hard layer.

28. The optical recording medium according to claim 27, wherein the magnetic stripe is provided on all the layers constituting the surface hard layer except for the outermost layer.

29. The optical recording medium according to claim 26, wherein the magnetic stripe is provided on the transparent protective layer.

30. The optical recording medium according to claim 27, wherein the outermost layer of the surface hard layer and the magnetic stripe together constitute one even and continuous surface.

31. The optical recording medium according to claim 27, wherein the magnetic stripe is embedded so as not to be exposed from the surface hard layer.

32. The optical recording medium according to claim 27, wherein all the layers constituting the surface hard layer except for the outermost layer includes at least an organic polymeric leveling agent.

33. The optical recording medium according to claim 27, wherein the layers constituting the surface hard layer comprise radiation-curable resins arranged such that the curing shrinkage of the layers successively increases from the innermost layer toward the outermost layer.

34. The optical recording medium according to claim 26, wherein a plurality of magnetic stripes are provided.

35. The optical recording medium according to claim 26, wherein at least one magnetic stripe is further provided on the card substrate side.

36. The optical recording medium according to claim 26, further comprising an IC chip.

37. The optical recording medium according to claim 1, 8, 12, 18, 22 or 26, further comprising a sublimation or fusion thermal transferred image and/or character information provided on the card substrate.

* * * * *